(12) United States Patent
Setsuda et al.

(10) Patent No.: US 9,981,380 B2
(45) Date of Patent: May 29, 2018

(54) TEACHING APPARATUS AND ROBOT SYSTEM

(71) Applicant: Seiko Epson Corporation, Tokyo (JP)

(72) Inventors: Nobuyuki Setsuda, Okaya (JP); Alan Rupert, Carson, CA (US)

(73) Assignee: Seiko Epson Corporation (JP)

( * ) Notice: Subject to any disclaimer, the term of this patent is extended or adjusted under 35 U.S.C. 154(b) by 268 days.

(21) Appl. No.: 14/753,401

(22) Filed: Jun. 29, 2015

(65) Prior Publication Data

US 2016/0001445 A1    Jan. 7, 2016

(30) Foreign Application Priority Data

Jul. 1, 2014 (JP) ................................. 2014-136315
Jul. 1, 2014 (JP) ................................. 2014-136316
Jul. 1, 2014 (JP) ................................. 2014-136317

(51) Int. Cl.
*B25J 9/16* (2006.01)
*G05B 19/425* (2006.01)

(52) U.S. Cl.
CPC ........... *B25J 9/1633* (2013.01); *B25J 9/1679* (2013.01); *G05B 19/425* (2013.01);
(Continued)

(58) Field of Classification Search
CPC ...... B25J 9/1633; B25J 9/1679; B25J 9/1656; B25J 9/1692; B25J 9/0081; G05B 19/425;
(Continued)

(56) References Cited

U.S. PATENT DOCUMENTS 4,456,961 A * 6/1984 Price ...................... B25J 9/1697
318/568.19
5,570,190 A * 10/1996 Terawaki ............... B25J 9/1692
348/95
(Continued)

FOREIGN PATENT DOCUMENTS

EP    1710649 A2    10/2006
JP    2002-154085 A    5/2002
(Continued)

OTHER PUBLICATIONS

Extended European Search Report for Application No. EP 15 17 4247 dated May 27, 2016 (8 pages).

*Primary Examiner* — Nicholas Kiswanto
(74) *Attorney, Agent, or Firm* — Harness, Dickey & Pierce, P.L.C.

(57) ABSTRACT

A teaching apparatus for a robot which moves a work object so that the work object is aligned at a predetermined position and attitude, includes a display section that displays a screen for setting the predetermined position and attitude, an operation section that allows the screen to be operated, and a computation section that computes the predetermined position and attitude, in which the screen includes a first screen for operating the robot so as to move the work object into an imaging range of an imaging device, and a second screen for moving the work object so that the work object is aligned at a target position and attitude, and in which the computation section computes the predetermined position and attitude by using a captured image obtained by the imaging device imaging the work object, and the target position and attitude.

5 Claims, 28 Drawing Sheets

(52) U.S. Cl.
CPC .............. *G05B 2219/39107* (2013.01); *G05B 2219/40053* (2013.01); *G05B 2219/40099* (2013.01); *Y10S 901/03* (2013.01)

(58) Field of Classification Search
CPC ........... G05B 2219/39107; G05B 2219/40053; G05B 2219/40099; Y10S 901/03
See application file for complete search history.

(56) References Cited

U.S. PATENT DOCUMENTS

| | | | | |
|---|---|---|---|---|
| 6,163,946 | A * | 12/2000 | Pryor | A01B 69/008 29/407.04 |
| 8,180,487 | B1 * | 5/2012 | Vangal-Ramamurthy | B25J 9/1692 219/121.78 |
| 9,622,826 | B2 * | 4/2017 | Diolaiti | A61B 34/30 |
| 2003/0078694 | A1 * | 4/2003 | Watanabe | B25J 9/1697 700/245 |
| 2003/0202092 | A1 * | 10/2003 | Sadighi | B25J 9/1692 348/87 |
| 2004/0186627 | A1 * | 9/2004 | Watanabe | G05B 19/402 700/264 |
| 2005/0021177 | A1 * | 1/2005 | Bacchi | B25J 9/1692 700/245 |
| 2005/0035519 | A1 * | 2/2005 | Ito | B25J 9/1687 269/329 |
| 2007/0293987 | A1 | 12/2007 | Yamada et al. | |
| 2008/0188983 | A1 * | 8/2008 | Ban | B25J 9/1692 700/245 |
| 2008/0249659 | A1 | 10/2008 | Ueyama | |
| 2009/0096148 | A1 * | 4/2009 | Usui | B23Q 41/02 269/45 |
| 2009/0157226 | A1 * | 6/2009 | de Smet | B25J 9/1692 700/254 |
| 2012/0059517 | A1 | 3/2012 | Nomura | |
| 2012/0113268 | A1 | 5/2012 | Ito et al. | |
| 2012/0239194 | A1 * | 9/2012 | Kagawa | B25J 9/1692 700/254 |
| 2012/0294509 | A1 | 11/2012 | Matsumoto | |
| 2013/0211597 | A1 * | 8/2013 | Sommerville | B25J 9/1602 700/264 |
| 2016/0114485 | A1 | 4/2016 | Nomura | |
| 2016/0325430 | A1 * | 11/2016 | Yoshida | H01L 21/681 |

FOREIGN PATENT DOCUMENTS

| | | |
|---|---|---|
| JP | 2008-003713 A | 1/2008 |
| JP | 2012-055999 A | 3/2012 |
| JP | 2012-230041 A | 11/2012 |
| JP | 2012-254518 A | 12/2012 |
| JP | 2013-132726 A | 7/2013 |
| JP | 2014-104529 A | 6/2014 |

* cited by examiner

TEACHING APPARATUS AND ROBOT SYSTEM

BACKGROUND

1. Technical Field

The present invention relates to a teaching apparatus and a robot system.

2. Related Art

In the related art, a robot system which aligns a work object gripped (picked up) by a robot at a predetermined position and attitude has been researched and developed.

In relation thereto, a method of controlling a robot which can grip a member to be gripped with an appropriate gripping force to reliably grip the member to be gripped without damaging the member to be gripped regardless of an appearance of the member to be gripped is known (refer to JP-A-2013-132726).

In such a robot system, in order to accurately align the work object at the predetermined position and attitude, it is necessary to detect (calculate) a position and an attitude of the picked-up work object and a deviation (offset) of the attitude relative to a reference attitude of the robot.

In relation thereto, there are a robot system in which an imaging section detecting a position and an attitude of a work object gripped (picked up) by a robot is provided, and an image processing apparatus detecting (calculating) a position and an attitude of the work object on the basis of a captured image obtained by the imaging section is provided separately from a control apparatus controlling the robot, and a method of capturing an image of the picked-up work object and detecting a position and an attitude of the picked-up work object by using the captured image (refer to JP-A-2012-230041).

However, in the method of the related art disclosed in JP-A-2013-132726, it is necessary to accurately teach the predetermined position and attitude to the robot in order to accurately align the work object at the predetermined position and attitude. Also in other methods, it is important to accurately teach a predetermined position and attitude of a work object to a robot. However, in the methods of the related art, it is difficult to accurately teach the predetermined position and attitude.

In addition, in the robot system of the related art as disclosed in JP-A-2012-230041, the control apparatus receives an image processing result from the image processing apparatus, and the control apparatus performs computation regarding image processes such as calculation of the above-described offset or calculation of a position and an attitude of a manipulator and a position and an attitude of a gripping portion, obtained in consideration of the offset.

For this reason, a program for performing such computation is required to be incorporated into a program which defines an operation of the robot, and thus a large load is put on a user associated with creation of the program. Since a created program differs for each control apparatus, a large load is also put on the user associated with creation of the program. It is hard for the user to increase work efficiency due to such a load when using the robot system of the related art. Further, not the image processing apparatus but the control apparatus performs computation regarding image processes. As mentioned above, in a case where the control apparatus and the image processing apparatus share computation regarding image processes, and the control apparatus performs the computation regarding image processes, the robot may not be efficiently controlled compared with a case where the control apparatus performs only control of the robot.

In such a method, in order to cause the robot to accurately align a work object at a predetermined position and attitude, it is necessary to acquire an attitude of the work object in a pixel coordinate system, and a relationship (coordinate transform matrix) between the pixel coordinate system and a robot coordinate system.

The relationship between the pixel coordinate system and the robot coordinate system may be acquired through calibration of an imaging section and the robot. On the other hand, an attitude of the work object in the pixel coordinate system is acquired by the user creating a program, and thus this creation of the program puts a large burden on the user.

SUMMARY

An advantage of some aspects of the invention is to provide a teaching apparatus and a robot system which can easily perform highly accurate teaching. Another advantage of some aspects of the invention is to provide a teaching apparatus and a robot system capable of efficiently controlling a robot and reducing a burden on a user related to teaching.

One aspect of the invention is directed to a teaching apparatus for a robot which moves a work object so that the work object is aligned at a predetermined position and attitude, including a display section that displays a screen for setting the predetermined position and attitude; an operation section that allows the screen to be operated; and a computation section that computes the predetermined position and attitude, in which the screen includes a first screen for operating the robot so as to move the work object into an imaging range of an imaging device; and a second screen for moving the work object so that the work object is aligned at a target position and attitude, and in which the computation section computes the predetermined position and attitude by using a captured image obtained by the imaging device imaging the work object, and the target position and attitude.

With this configuration, in the teaching apparatus, the first screen for operating the robot so as to move the work object into the imaging range of the imaging device and the second screen for moving the work object so that the work object is aligned at the target position and attitude are operated by using the operation section, and the predetermined position and attitude are computed by using the captured image obtained by the imaging device imaging the work object, and the target position and attitude. Consequently, the teaching apparatus can easily perform highly accurate teaching.

In another aspect of the invention, in the teaching apparatus, either or both of the first screen and the second screen may include a region in which the captured image obtained by the imaging device is displayed.

With this configuration, the teaching apparatus displays the captured image obtained by the imaging device on either or both of the first screen and the second screen. Consequently, the teaching apparatus can provide a user with an environment in which the user moves the robot through a jog operation while checking the captured image.

In another aspect of the invention, in the teaching apparatus, either or both of the first screen and the second screen may include a region in which a work procedure is displayed.

With this configuration, the teaching apparatus displays a work procedure on either or both of the first screen and the second screen. Consequently, the teaching apparatus can reduce time and effort for the user to read a manual and thus allows the user to perform efficient work.

In another aspect of the invention, in the teaching apparatus, the computation section may calculate a relative position and attitude between the target position and attitude and the predetermined position and attitude by using the captured image on the basis of an operation which is input via the first screen by using the operation section, and may acquire the target position and attitude on the basis of an operation which is input via the second screen by using the operation section and may compute the predetermined position and attitude by using the calculated relative position and attitude and the acquired target position and attitude.

With this configuration, a relative position and attitude between the target position and attitude and the predetermined position and attitude are calculated by using the captured image on the basis of an operation which is input via the first screen by using the operation section. The target position and attitude are acquired on the basis of an operation which is input via the second screen by using the operation section and the predetermined position and attitude are computed by using the calculated relative position and attitude and the acquired target position and attitude. With this configuration, the teaching apparatus can realize highly accurate work by calculating a relative position and attitude between a target position and attitude and a predetermined position and attitude for each piece of work.

One aspect of the invention is directed to a robot system including a robot that moves a work object so that the work object is aligned at a predetermined position and attitude; and a teaching apparatus that teaches the predetermined position and attitude to the robot, in which the teaching apparatus includes a display section that displays a screen for setting the predetermined position and attitude; an operation section that allows the screen to be operated; and a computation section that computes the predetermined position and attitude, in which the screen includes a first screen for operating the robot so as to move the work object into an imaging range of an imaging device; and a second screen for moving the work object so that the work object is aligned at a target position and attitude, and in which the computation section computes the predetermined position and attitude by using a captured image obtained by the imaging device imaging the work object, and the target position and attitude.

With this configuration, in the robot system, the first screen for operating the robot so as to move the work object into the imaging range of the imaging device and the second screen for moving the work object so that the work object is aligned at the target position and attitude are operated by using the operation section, and the predetermined position and attitude are computed by using the captured image obtained by the imaging device imaging the work object, and the target position and attitude. Consequently, the robot system can easily perform highly accurate teaching.

As described above, in the teaching apparatus and the robot system, the first screen for operating the robot so as to move the work object into the imaging range of the imaging device and the second screen for moving the work object so that the work object is aligned at the target position and attitude are operated by using the operation section, and the predetermined position and attitude are computed by using the captured image obtained by the imaging device imaging the work object, and the target position and attitude. Consequently, the teaching apparatus and the robot system can easily perform highly accurate teaching.

One aspect of the invention is directed to a teaching apparatus for a robot which moves a work object, including a display section that displays a screen for setting an attitude of the work object; an operation section that allows the screen to be operated; and a detection section that detects the attitude of the work object, in which the screen includes a first screen for displaying the work object placed within an imaging range of an imaging device; and a second screen for causing the robot to grip the work object placed within the imaging range of the imaging device, and in which the detection section detects the attitude of the work object by using a result of the robot gripping the work object.

With this configuration, the teaching apparatus displays the first screen for displaying the work object placed within the imaging range of the imaging device and the second screen for causing the robot to grip the work object placed within the imaging range of the imaging device, and detects the attitude of the work object by using a result of the robot gripping the work. Consequently, the teaching apparatus can reduce a burden on a user related to teaching.

In another aspect of the invention, in the teaching apparatus, the detection section may detect an attitude of the work object relative to the imaging range as a reference attitude of the work object on the basis of the work object placed within the imaging range of the imaging device, displayed on the first screen.

With this configuration, the teaching apparatus detects an attitude of the work object relative to the imaging range as a reference attitude of the work object on the basis of the work object placed within the imaging range of the imaging device, displayed on the first screen. Consequently, the teaching apparatus can teach the detected reference attitude of the work object.

In another aspect of the invention, the teaching apparatus may further include a computation section that computes an attitude of another work object placed within the imaging range by using the reference attitude of the work object detected by the detection section and the result of the robot gripping the work object.

With this configuration, the teaching apparatus computes an attitude of a work object which is newly placed within the imaging range by using the reference attitude of the work object detected by the detection section and the result of the robot gripping the work object. Consequently, the teaching apparatus can perform predetermined work on the work object on the basis of an attitude of the work object computed by using the reference attitude of the work object and the result of the robot gripping the work object.

In another aspect of the invention, in the teaching apparatus, the second screen may include a region in which the captured image obtained by the imaging device is displayed.

With this configuration, the teaching apparatus displays the captured image obtained by the imaging device on the second screen. Consequently, the teaching apparatus can provide a user with an environment in which the user moves the robot through an operation while checking the captured image.

In another aspect of the invention, in the teaching apparatus, either or both of the first screen and the second screen may include a region in which a work procedure is displayed.

With this configuration, the teaching apparatus displays a work procedure on either or both of the first screen and the second screen. Consequently, the teaching apparatus can reduce time and effort for the user to read a manual and thus allows the user to perform efficient work.

One aspect of the invention is directed to a robot system including a robot that moves a work object; and a teaching apparatus that teaches an attitude of the work object to the robot, in which the teaching apparatus includes a display section that displays a screen for setting an attitude of the work object; an operation section that allows the screen to be operated; and a detection section that detects the attitude of the work object, in which the screen includes a first screen for displaying the work object placed within an imaging range of an imaging device; and a second screen for causing the robot to grip the work object placed within the imaging range of the imaging device, and in which the detection section detects the attitude of the work object by using a result of the robot gripping the work object.

With this configuration, the robot system displays the first screen for displaying the work object placed within the imaging range of the imaging device and the second screen for causing the robot to grip the work object placed within the imaging range of the imaging device, and detects the attitude of the work object by using a result of the robot gripping the work. Consequently, the robot system can reduce a burden on a user related to teaching.

As described above, the teaching apparatus and the robot system display the first screen for displaying the work object placed within the imaging range of the imaging device and the second screen for causing the robot to grip the work object placed within the imaging range of the imaging device, and detect the attitude of the work object by using a result of the robot gripping the work. Consequently, the teaching apparatus and the robot system can reduce a burden on a user related to teaching.

One aspect of the invention is directed to a robot system including a robot that moves a work object; an imaging device that images the work object moved by the robot; a control apparatus that operates the robot; and an image processing apparatus that detects the work object moved by the robot by using a captured image obtained by the imaging device, in which the image processing apparatus calculates a positional relationship between a first position of the robot and a second position of the work object moved by the robot by using the captured image.

With this configuration, in the robot system, the image processing apparatus calculates a positional relationship between the first position of the robot and the second position of the work object moved by the robot by using the captured image. Consequently, the robot system can efficiently control the robot.

In another aspect of the invention, in the robot system, the robot may include a hand and may move the work object gripped by the hand, and the image processing apparatus may detect a predetermined position of the hand from the captured image as the first position.

With this configuration, the robot system detects a predetermined position of the hand from the captured image as the first position. Consequently, the robot system can calculate a positional relationship between the predetermined position of the hand and the second position of the work object.

In another aspect of the invention, in the robot system, the image processing apparatus may detect the positional relationship between the first position of the robot and the second position of the work object from the captured image through pattern matching.

With this configuration, the robot system detects the positional relationship between the first position of the robot and the second position of the work object from the captured image through pattern matching. Consequently, the robot system can calculate the positional relationship between the first position of the robot and the second position of the work object from the captured image through pattern matching.

As described above, in the robot system, the image processing apparatus calculates the positional relationship between the first position of the robot and the second position of the work object moved by the robot by using the captured image. Consequently, the robot system has high versatility related to replacement of the included apparatuses and can reduce time and effort required in the replacement.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment
Outline

Figure 1:
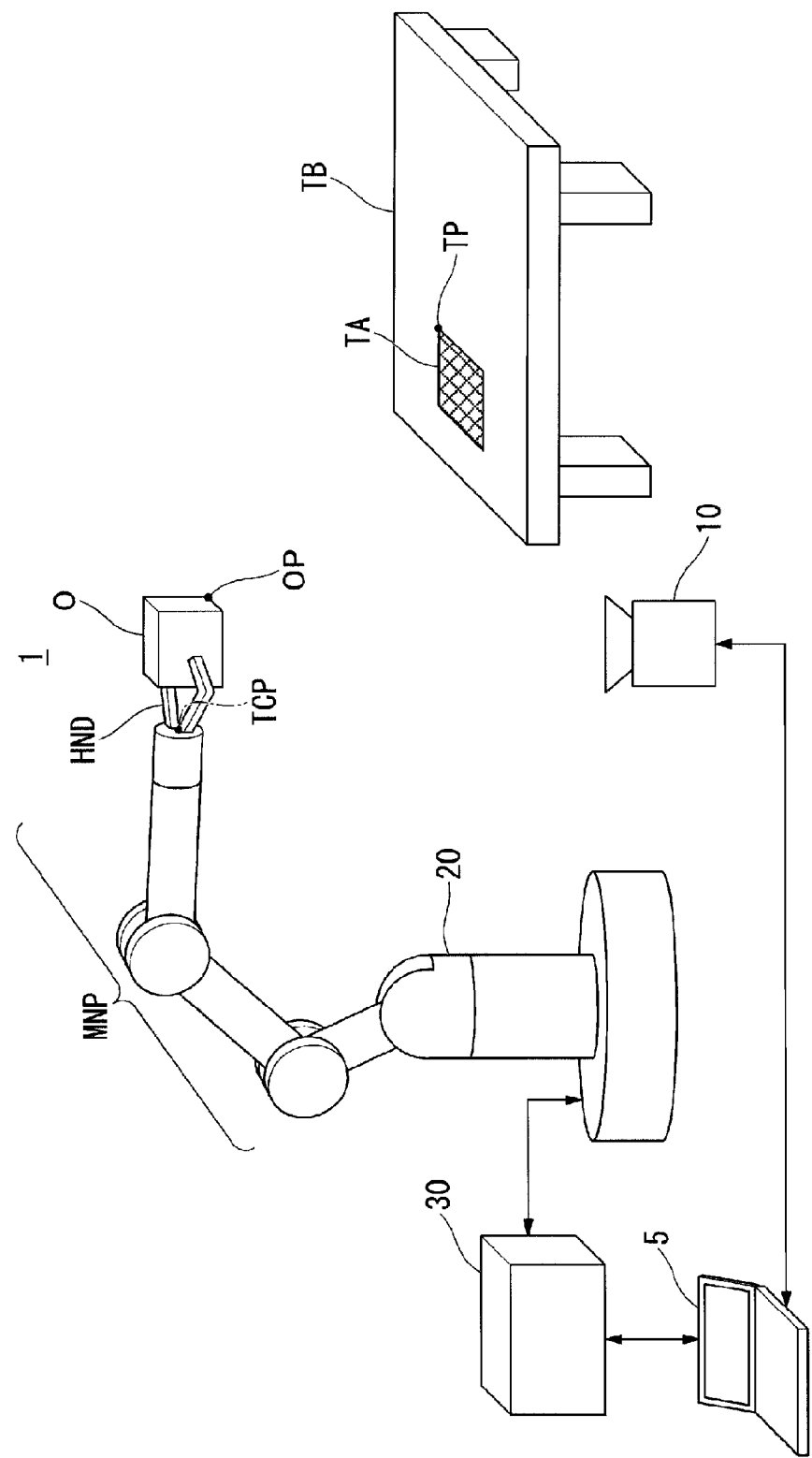
FIG. 1 is a diagram illustrating a configuration example of a robot system according to the present embodiment and an example of a state in which a robot performs predetermined work.

First, a summary of a robot system 1 according to the following embodiment will be described, and then the embodiment will be described in detail. FIG. 1 is a diagram illustrating an example of a configuration of the robot system 1 according to the present embodiment and illustrating an example of a state in which a robot 20 performs predetermined work.

The robot system 1 includes a teaching apparatus 5, an imaging section 10, a single-arm robot 20 provided with a gripping portion HND (end effector) and a manipulator MNP, and a control apparatus 30. In the present embodiment, the single-arm robot indicates a robot having a single arm constituted by the gripping portion HND and the manipulator MNP.

The robot system 1 teaches parameter information required for the robot 20 to perform predetermined work to the control apparatus 30 which controls the robot 20 before the robot 20 performs the predetermined work, by a user operating a graphical user interface (GUI) displayed on the teaching apparatus 5. In the present embodiment, the predetermined work indicates that the robot 20 grips a work object O with the gripping portion HND and disposes the gripped work object O in a target area TA.

The robot system 1 illustrated in FIG. 1 causes the robot 20 to move the work object O to a predetermined imaging position and causes the imaging section 10 to capture an image of the moved work object O when the gripped work object O is disposed in the target area TA in this predetermined work. The robot system 1 controls the robot 20 so that the work object O gripped by the gripping portion HND is disposed in the target area TA on the basis of a captured image obtained by the imaging section 10.

When the robot 20 is controlled so that the work object O gripped by the gripping portion HND is disposed in the target area TA on the basis of the captured image, the robot system 1 uses the parameter information taught by the teaching apparatus 5 before performing the predetermined work. More specifically, disposing the work object O in the target area TA is to move the gripping portion HND so that a position and an attitude (hereinafter, referred to as a work object position and attitude) of a representative point OP which is set in the work object O in advance match a position and an attitude (hereinafter, referred to as target point position and attitude) of a target point TP of the target area TA. The target point position and attitude are an example of a target position and attitude.

Here, the work object O is an object which can be gripped by the robot 20, and is an industrial part such as a screw, a bolt, a gear, or a tool, but is not limited thereto, and may be other objects as long as the objects can be gripped by the robot 20. The representative point OP of the work object O is a point which is set in the control apparatus 30 in advance, and is a feature point of the work object O and is one of corners of the work object O illustrated in FIG. 1 in this example. The corner is preferably a corner of a surface which is a bottom surface when the work object O is disposed in the target area TA in order to facilitate computation performed by the robot system 1. The work object O is an example of a work object.

The target area TA is an area in which the work object O is disposed by the robot 20, and is provided on a table TB in FIG. 1. The table TB is, for example, a stand on which the robot 20 disposes the work object O. The target point TP is a point in the target area TA in which the work object O is disposed by the robot 20 and is a point which matches the representative point OP when the work object O is disposed in the target area TA at an accurate position and attitude.

Here, the robot system 1 illustrated in FIG. 1 moves a position and an attitude (hereinafter, referred to as a control point position and attitude) of a control point TCP of the gripping portion HND as a position and an attitude of the gripping portion HND when the gripping portion HND of the robot 20 is moved. The control point TCP of the gripping portion HND indicates a position and an attitude of the gripping portion HND when the control apparatus 30 moves the gripping portion HND and the manipulator MNP of the robot 20, and indicates a central point (a tool center point) of a flange provided at an end of the manipulator MNP at which the gripping portion HND is provided in this example.

This control point position and attitude do not generally (except for special cases) match a work object position and attitude. For this reason, the robot system 1 illustrated in FIG. 1 calculates a control point position and attitude (hereinafter, referred to as a control point target position and attitude) when the work object position and attitude match the target point position and attitude on the basis of relative positions and relative attitudes (hereinafter, referred to as an offset) between the control point position and attitude of the gripping portion HND and the work object position and attitude and the target point position and attitude, and can thus dispose the work object O in the target area TA in a desired state (that is, a state in which the work object position and attitude match the target point position and attitude). The robot system 1 moves the gripping portion HND (that is, the control point TCP) so that the calculated control point target position and attitude match the control point position and attitude, and can thus dispose the work object O in the target area TA in a desired state. The control point target position and attitude are an example of a predetermined position and attitude.

The teaching apparatus 5 teaches an offset and a target point position and attitude necessary to calculate the control point target position and attitude to the control apparatus 30. In addition, the teaching apparatus 5 provides, to a user, an interface which allows the user to easily teach the offset and the target point position and attitude to the control apparatus 30 via a GUI realized by a dedicated application. Thus, the robot system 1 can easily perform highly accurate teaching with the teaching apparatus 5. Hereinafter, the offset which is taught to the control apparatus 30 by the teaching apparatus 5 is referred to as a reference offset.

Hereinafter, detailed description will be made of teaching performed by the teaching apparatus 5. In the robot system 1, the teaching apparatus 5 teaches the offset and the target point position and attitude to the control apparatus 30, and then predetermined work is repeatedly performed on a plurality of work objects O. When the predetermined work is repeatedly performed, the robot system 1 causes the imaging section 10 to capture an image of the work object O every time the predetermined work is performed (that is, every time a new work object O is gripped by the gripping portion HND), and calculates an offset on the basis of the captured image. Hereinafter, the offset which is calculated in the middle of the predetermined work being performed is referred to as a calculation offset.

The calculation offset is influenced by an error occurring when a new work object O is gripped and thus does not generally match the reference offset. The robot system 1 calculates a control point target position and attitude in a state in which the calculation offset is realized on the basis of the reference offset, the target point position and attitude, and the calculation offset. Consequently, the robot system 1 can cause the robot 20 to perform predetermined work with high accuracy. This is an effect obtained as a result of the teaching apparatus 5 teaching the reference offset and the target point position and attitude to the control apparatus 30 in the robot system 1. The predetermined work may be other pieces of work related to movement of the work object O instead of the robot 20 disposing the gripped work object O in the target area TA.

Figure 2:
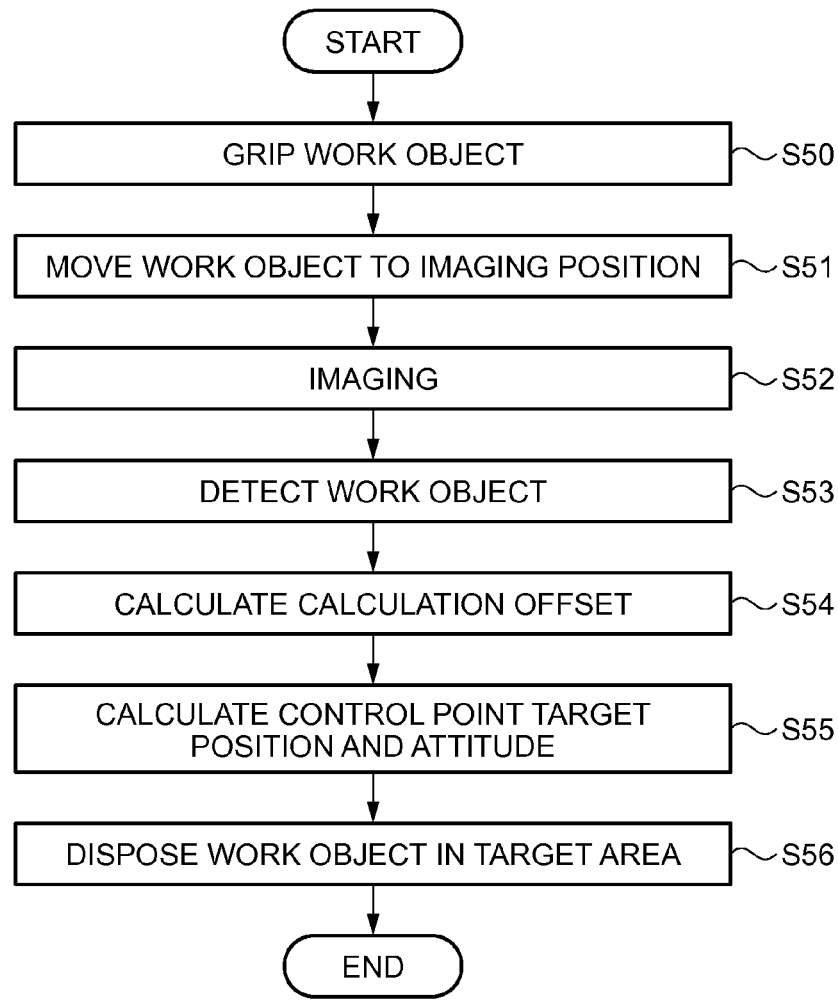
FIG. 2 is a flowchart illustrating an example of a flow of a process related to predetermined work performed by each device included in the robot system.

Here, with reference to FIG. 2, a description will be made of a process related to predetermined work performed by each device included in the robot system 1. FIG. 2 is a flowchart illustrating an example of a process related to predetermined work performed by each device included in the robot system 1. First, the control apparatus 30 causes the work object O to be gripped (step S50). Next, the control apparatus 30 causes the work object O to be moved to a predetermined imaging position (step S51).

Next, the control apparatus 30 causes the imaging section 10 to capture an image via the teaching apparatus 5 (step S52). Next, the teaching apparatus 5 detects the work object O on the basis of the image captured by the imaging section 10 (step S53). Next, the teaching apparatus 5 calculates a calculation offset related to the work object O detected in step S53 on the basis of the image captured by the imaging section 10 (step S54). The teaching apparatus 5 outputs the calculation offset which has been calculated to the control apparatus 30.

Next, the control apparatus 30 calculates a control point target position and attitude on the basis of the calculation offset acquired from the teaching apparatus 5, and the reference offset and the target point position and attitude taught by the teaching apparatus 5 (step S55). In addition, the teaching apparatus 5 may calculate a control point target position and attitude, and the control apparatus 30 may acquire the control point target position and attitude calculated by the teaching apparatus 5. Next, the control apparatus 30 moves the robot 20 so that a control point position and attitude match the control point target position and attitude calculated in step S55, and thus the work object O is disposed in the target area TA (step S56).

Embodiment

Hereinafter, an embodiment of the invention will be described with reference to the drawings. As described above, the robot system 1 according to the present embodiment illustrated in FIG. 1 includes the teaching apparatus 5, the imaging section 10, the robot 20, and the control apparatus 30.

The teaching apparatus 5 is, for example, a notebook personal computer (PC), but may alternatively be a desktop PC, a tablet PC, a mobile phone terminal, a multi-function mobile phone terminal (smartphone), a personal digital assistant (PDA), or the like. The teaching apparatus 5 is communicably connected to the imaging section 10 via a cable. Wired communication using the cable is realized by a standard such as Ethernet (registered trademark) or a universal serial bus (USB). The teaching apparatus 5 may be connected to the imaging section 10 by using wireless communication realized by a communication standard such as Wi-Fi (registered trademark).

The teaching apparatus 5 acquires a captured image from the imaging section 10. A dedicated application is installed in the teaching apparatus 5 which displays a GUI for realizing the application. The teaching apparatus 5 receives an operation from a user via the GUI, and calculates a reference offset between a work object position and attitude of the work object O and a control point position and attitude of the target point TP on the basis of the received operation and the captured image acquired from the imaging section 10.

If the user moves the gripping portion HND through a jog operation, the teaching apparatus 5 matches the work object position and attitude with a target point position and attitude, then receives an operation from the user via the GUI, and acquires information indicating a control point target position and attitude from the control apparatus 30. The teaching apparatus 5 calculates a target point position and attitude of the target area TA on the basis of the acquired control point target position and attitude and the calculated reference offset. Consequently, the teaching apparatus 5 can capture an image of a range including the target area TA with the imaging section, and can teach the target point position and attitude to the control apparatus 30 without performing a process of detecting the target point position and attitude on the basis of the captured image. A jog knob for performing a jog operation may be provided in the teaching apparatus 5 and may be provided in the control apparatus 30. In a case where the jog knob is provided in the teaching apparatus 5, the teaching apparatus 5 moves the robot 20 through a jog operation via the control apparatus 30.

The teaching apparatus 5 outputs (teaches) information indicating the reference offset, and the target point position and attitude to the control apparatus 30. The teaching apparatus 5 may output only the information indicating the reference offset to the control apparatus 30. In this case, the target point position and attitude are assumed to be stored in the control apparatus 30 in advance. Hereinafter, a description will be made assuming that the teaching apparatus 5 outputs the information indicating the reference offset and the target point position and attitude to the control apparatus 30.

When the robot system 1 causes the robot 20 to perform predetermined work, the teaching apparatus 5 causes the imaging section 10 to capture an image of a range including the work object O in response to a request from the control apparatus 30. The teaching apparatus 5 calculates a calculation offset on the basis of the captured image. The teaching apparatus calculates a calculation offset for each piece of predetermined work in response to a request from the control apparatus 30, and calculates a control point target position and attitude for each piece of predetermined work on the basis of the reference offset, the target point position and attitude, and the calculation offset. In this case, the teaching apparatus 5 outputs information indicating the calculated control point target position and attitude to the control apparatus 30. As another configuration example, the teaching apparatus 5 outputs information indicating the calculation offset to the control apparatus 30 for each piece of predetermined work in response to a request from the control apparatus 30. In this case, not the teaching apparatus 5 but the control apparatus 30 calculates a control point target position and attitude.

The imaging section 10 is a camera including, for example, a charge coupled device (CCD) or a complementary metal oxide semiconductor (CMOS) which is an imaging element converting collected light into an electric signal. The imaging section 10 is a monocular camera, but may be formed of two or more cameras such as a stereo camera.

The imaging section 10 is communicably connected to the teaching apparatus 5 via a cable. Wired communication using the cable is realized by a standard such as Ethernet (registered trademark) or a USB. The imaging section 10 may be connected to the teaching apparatus 5 by using wireless communication realized by a communication standard such as Wi-Fi (registered trademark). The imaging section 10 and the teaching apparatus 5 may be formed not separately from each other but integrally with each other.

The imaging section 10 is provided at a position where a range (hereinafter, referred to as an imaging range) including the above-described control point TCP and the representative point OP of the work object O gripped by the gripping portion HND can be imaged when the gripping portion HND gripping the work object O is moved to a predetermined imaging position. In FIG. 1, the imaging section 10 is provided at a position where an image of the above-described imaging range can be captured vertically upward from below.

Instead of the configuration in which the imaging section 10 is provided at a position where an image of the above-described imaging range can be captured vertically upward from below, there may be a configuration in which the imaging section 10 is provided at a position where an image of the imaging range can be captured in a horizontal direction, a configuration in which the imaging section 10 is provided at a position where an image of the imaging range can be captured vertically downward from above, and a configuration in which the imaging section 10 is provided at a position where an image of the imaging range can be captured from other directions. The imaging section 10 captures a moving image as a captured image, but may alternatively capture a still image, or a still image and a moving image as a captured image. The imaging section 10 is an example of an imaging device.

The robot 20 is a single-arm robot including, for example, the gripping portion HND, the manipulator MNP, and a plurality of actuator (not illustrated). The robot 20 may be a SCARA robot (horizontally articulated robot) or a dual-arm robot instead of the single-arm robot. The SCARA robot is a robot of which a manipulator is moved only in a horizontal direction, and only a slide shaft at a front end of the manipulator is moved in a vertical direction. The dual-arm robot is a robot including two arms, each of which is constituted by the gripping portion HND and the manipulator MNP.

The arm of the robot 20 is of a six-axis vertically articulated type, and can perform an operation of a six-axial degree of freedom through interlocking operations among the support stand, the manipulator MNP, and the gripping portion HND using the actuators. The arm of the robot 20 may operate in five or less degrees of freedom (five axes) or may operate in seven or more degrees of freedom (seven axes). Hereinafter, a description will be made of an operation of the robot 20, performed by the arm including the gripping portion HND and the manipulator MNP. The gripping portion HND of the robot 20 is provided with claws which can grip an object.

The robot 20 is communicably connected to the control apparatus 30 via, for example, a cable. Wired communication using the cable is realized by a standard such as Ethernet (registered trademark) or a USB. The robot 20 may be connected to the control apparatus 30 by using wireless communication realized by a communication standard such as Wi-Fi (registered trademark). In the robot system 1, the robot 20 is configured to be connected to the control apparatus 30 which is provided outside the robot 20 as illustrated in FIG. 1, but the control apparatus 30 may be built into the robot 20 instead of this configuration.

The robot 20 acquires a control signal generated by the control apparatus 30, and moves the gripping portion HND and the manipulator MNP of the robot 20 on the basis of the acquired control signal.

In response to a request from the teaching apparatus 5, the control apparatus 30 outputs, to the teaching apparatus 5, information indicating a control point position and attitude (that is, a control point target position and attitude) obtained when a state is realized in which the teaching apparatus 5 performs teaching and a work object position and attitude match a target point position and attitude through a user's jog operation. Then, the control apparatus 30 acquires information indicating a reference offset and information indicating the target point position and attitude from the teaching apparatus 5.

When the robot system 1 causes the robot 20 to perform predetermined work, the control apparatus 30 causes the teaching apparatus 5 to calculate a calculation offset on the basis of a captured image which is acquired by the teaching apparatus 5. The control apparatus 30 acquires the calculation offset which has been calculated from the teaching apparatus 5. The control apparatus 30 calculates a control point target position and attitude during the predetermined work on the basis of the reference offset, the target point position and attitude, and the calculation offset.

Figure 3:
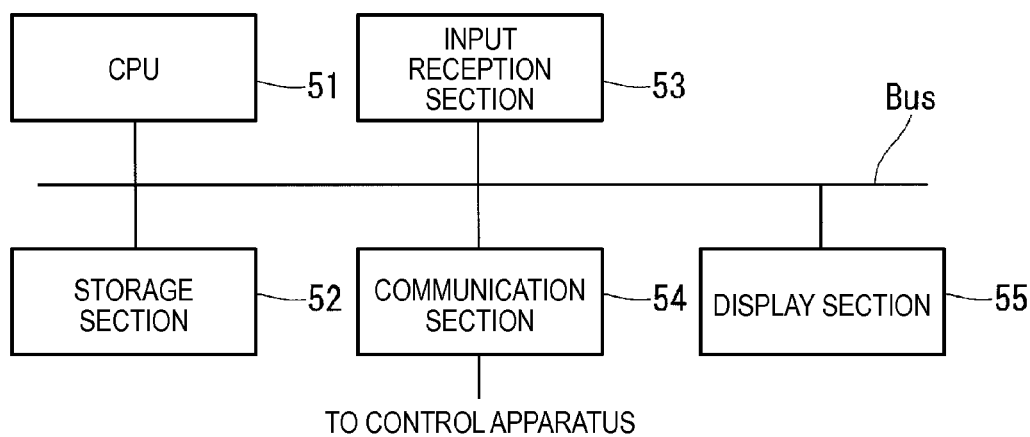
FIG. 3 is a diagram illustrating an example of a hardware configuration of a teaching apparatus.

Next, with reference to FIG. 3, a description will be made of a hardware configuration of the teaching apparatus 5. FIG. 3 is a diagram illustrating an example of a hardware configuration of the teaching apparatus 5. The teaching apparatus 5 includes, for example, a central processing unit (CPU) 51, a storage section 52, an input reception section 53, a communication section 54, and a display section 55, and performs communication with the control apparatus 30 via the communication section 54. These constituent elements are communicably connected to each other via a bus Bus. The CPU 51 executes various programs stored in the storage section 52.

The storage section 52 includes, for example, a hard disk drive (HDD), a solid state drive (SSD), an electrically erasable programmable read-only memory (EEPROM), a read only memory (ROM), and a random access memory (RAM), and stores various information pieces or images processed by the teaching apparatus 5, and programs. Instead of being built into the teaching apparatus 5, the storage section 52 may be an externally attached storage device which is connected to a digital input and output port such as a USB.

The input reception section 53 is, for example, a keyboard, a mouse, a touch pad, and other input devices. The input reception section 53 may be configured of a touch panel so as to function as a display section. The input reception section 53 is an example of an operation section.

The communication section 54 includes, for example, a digital input and output port such as a USB, or an Ethernet port.

The display section 55 is, for example, a liquid crystal display panel or an organic electroluminescent display panel.

Figure 4:
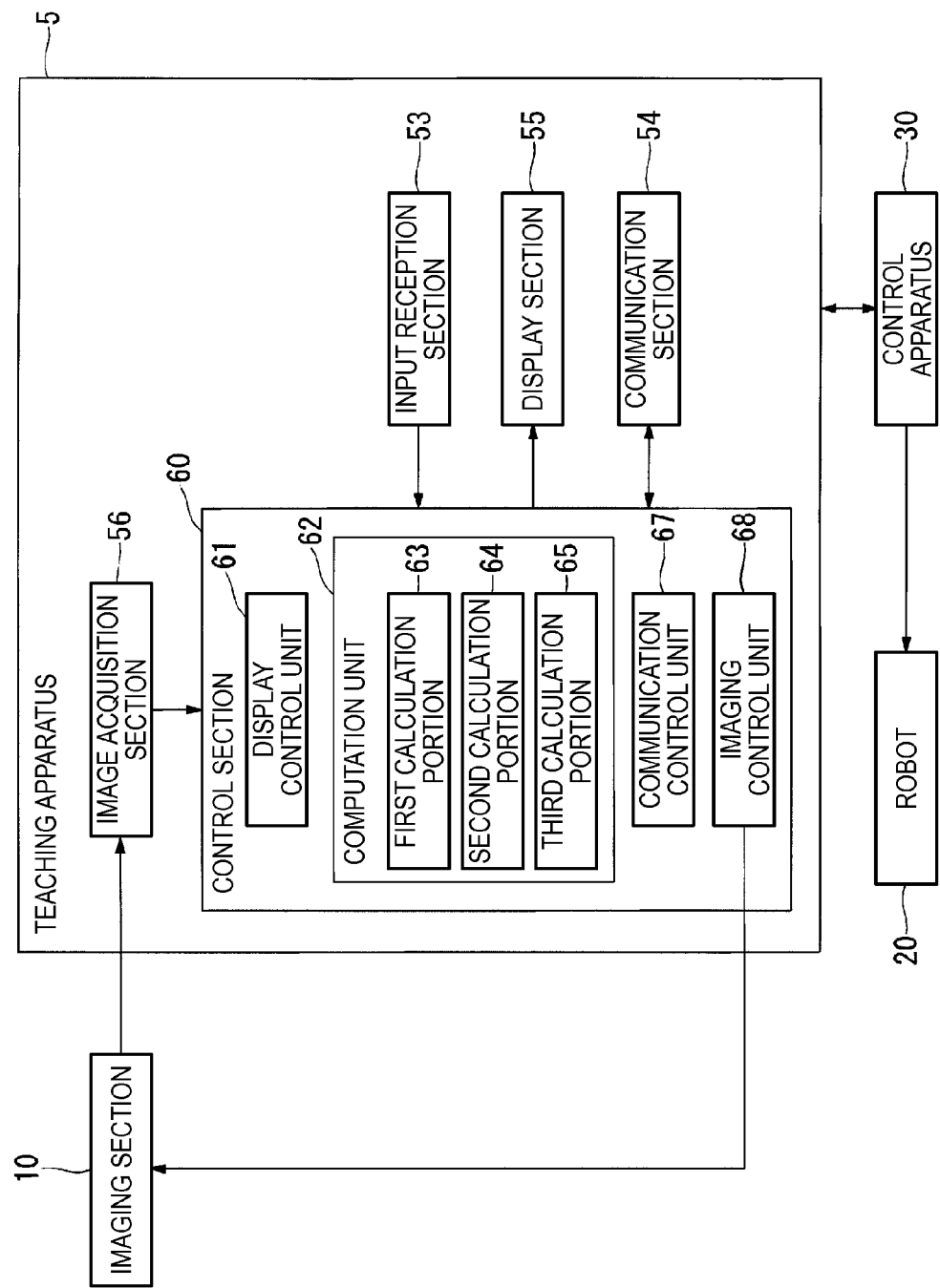
FIG. 4 is a diagram illustrating an example of a functional configuration of the teaching apparatus.

Next, with reference to FIG. 4, a functional configuration of the teaching apparatus 5 will be described. FIG. 4 is a diagram illustrating an example of a functional configuration of the teaching apparatus 5. The teaching apparatus 5 includes the input reception section 53, the communication section 54, the display section 55, an image acquisition section 56, and a control section 60. Some or all function units included in the control section 60 are realized by, for example, the CPU 51 executing the various programs stored in the storage section 52. In addition, some or all of the function units may be hardware function units such as a large scale integration (LSI) circuit or an application specific integrated circuit (ASIC).

The image acquisition section 56 acquires a captured image from the imaging section 10. The image acquisition section 56 outputs the acquired captured image to the control section 60.

The control section 60 includes a display control unit 61, a computation unit 62, a communication control unit 67, and an imaging control unit 68. The control section 60 controls the entire teaching apparatus 5.

The display control unit 61 generates a GUI for teaching a reference offset and a target point position and attitude to the control apparatus 30 on the basis of the acquired captured image, and displays the generated GUI. More specifically, the display control unit 61 generates a screen (GUI) for calculating a reference offset as a first teaching screen on the basis of a user's operation which is input by using the input reception section 53. The display control unit 61 controls the display section 55 so as to display the generated first teaching screen. The display control unit 61 generates a screen for calculating a target point position and attitude as a second teaching screen. The display control unit 61 controls the display section 55 to display the second teaching screen on the basis of a user's operation which is input by using the input reception section 53.

The computation unit 62 includes a first calculation portion 63, a second calculation portion 64, and a third calculation portion 65.

The first calculation portion 63 calculates (computes) a reference offset or a calculation offset between a control point position and attitude and a work object position and attitude of the work object O on the basis of the captured image acquired from the image acquisition section 56. When the reference offset is calculated, the first calculation portion 63 stores the calculated reference offset in the storage section 52.

The second calculation portion 64 acquires information indicating a control point target position and attitude from the control apparatus 30 via the communication section 54 controlled by the communication control unit 67. The second calculation portion 64 reads the reference offset from the storage section 52. The second calculation portion 64 calculates (computes) a target point position and attitude on the basis of the control point target position and attitude acquired from the control apparatus 30 and the reference offset (that is, the reference offset calculated by the first calculation portion 63) read from the storage section 52.

The third calculation portion 65 reads the reference offset from the storage section 52. The third calculation portion 65 calculates (computes) a control point target position and attitude obtained when the robot system 1 causes the robot 20 to perform predetermined work on the basis of the reference offset (that is, the reference offset calculated by the first calculation portion 63) read from the storage section 52, the calculation offset calculated by the first calculation portion 63, and the target point position and attitude calculated by the second calculation portion 64.

The communication control unit 67 controls the communication section 54 so that the reference offset calculated by the first calculation portion 63 is output to the control apparatus 30 on the basis of a user's operation which is input by using the input reception section 53 via the first teaching screen which is displayed on the display section 55 by the display control unit 61. The communication control unit 67 controls the communication section 54 so that the target point position and attitude calculated by the second calculation portion 64 is output to the control apparatus 30 on the basis of a user's operation which is input by using the input reception section 53 via the second teaching screen which is displayed on the display section 55 by the display control unit 61. The communication control unit 67 causes the calculation offset calculated by the first calculation portion 63 or the control point target position and attitude calculated by the third calculation portion 65 to be output to the control apparatus 30 in response to a request from the control apparatus 30.

The imaging control unit 68 controls the imaging section 10 to capture an image of an imaging possible range.

Figure 5:
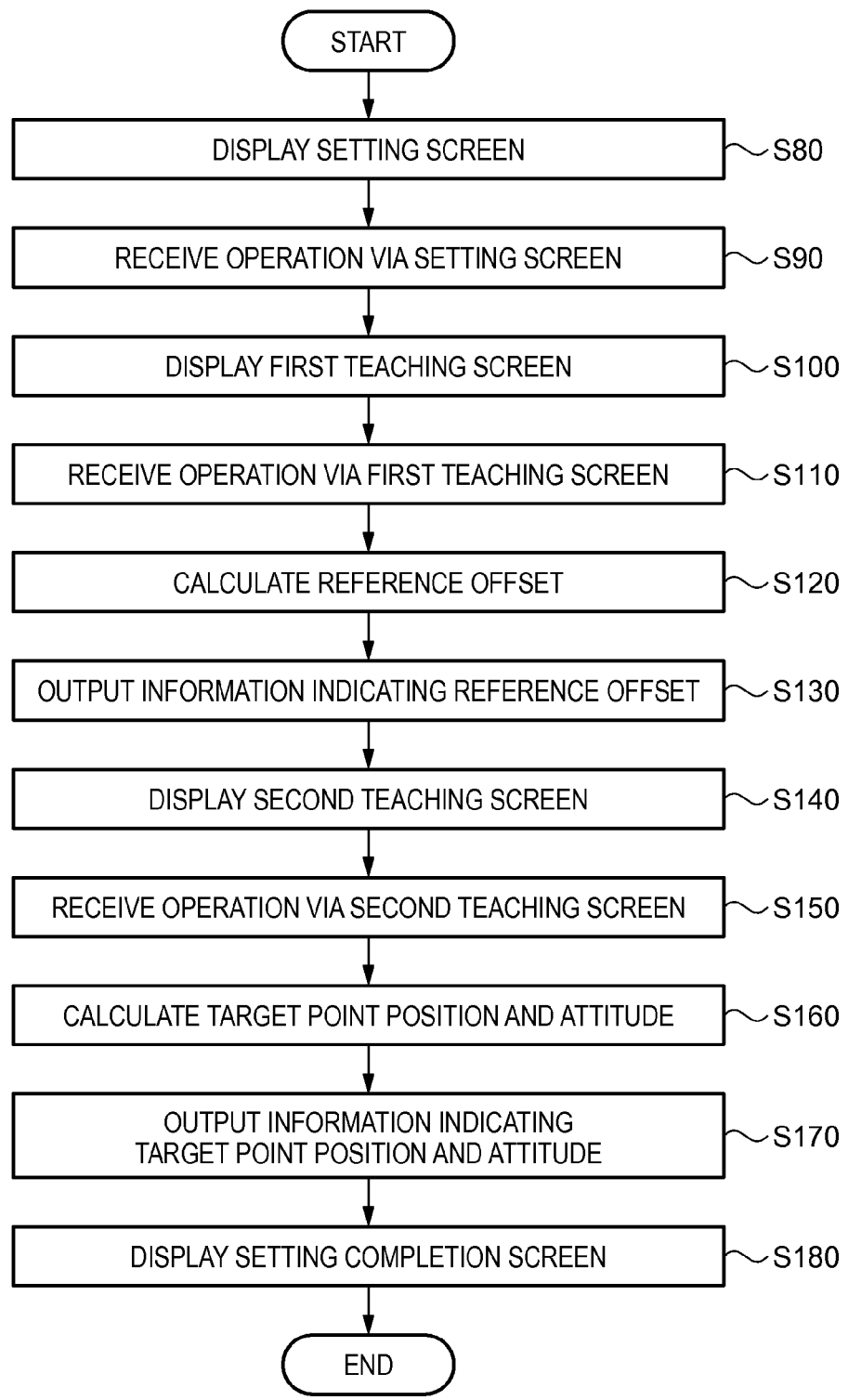
FIG. 5 is a flowchart illustrating an example of a flow of a process in which the teaching apparatus teaches a reference offset and target point position and attitude to a control apparatus.
Figure 6:
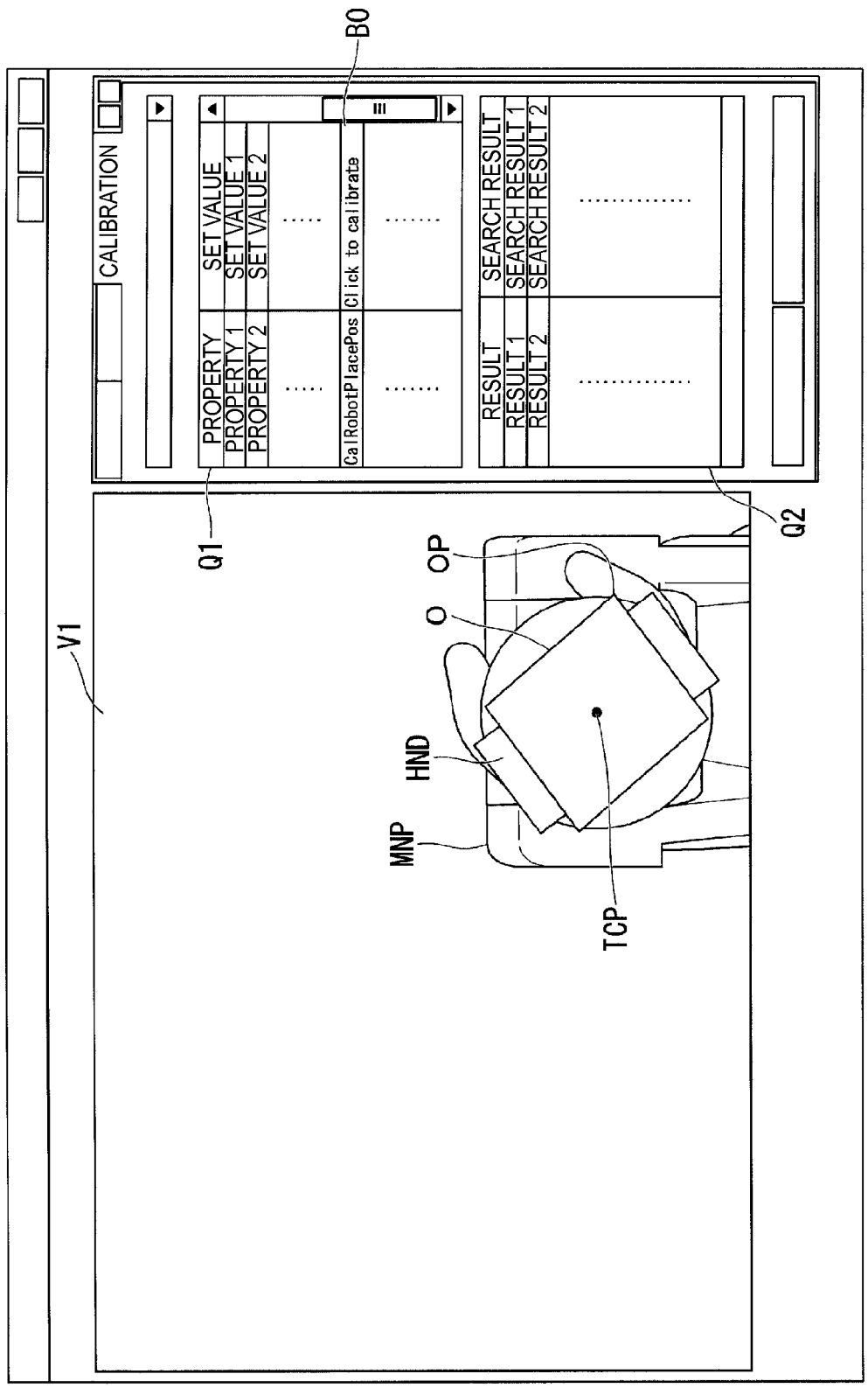
FIG. 6 is a diagram illustrating an example of a setting screen.

Hereinafter, with reference to FIG. 5, a description will be made of a process in which the teaching apparatus 5 teaches the reference offset and the target point position and attitude to the control apparatus 30. FIG. 5 is a flowchart illustrating an example of a flow of a process in which the teaching apparatus 5 teaches the reference offset and the target point position and attitude to the control apparatus 30. First, the display control unit 61 displays a setting screen on the basis of a user's operation which is input by using the input reception section 53 (step S80). Next, the control section 60 of the teaching apparatus 5 receives a user's operation which is input via the setting screen by using the input reception section 53 (step S90). Here, with reference to FIG. 6, the setting screen will be described. FIG. 6 is a diagram illustrating an example of the setting screen.

The display control unit 61 acquires a captured image obtained by the imaging section 10 from the image acquisition section 56, and displays the acquired captured image in a region V1. The display control unit 61 displays a property column Q1 on the setting screen illustrated in FIG. 6. The property column Q1 is a column which displays a list of items which can be taught to the control apparatus 30 by the teaching apparatus 5 and is a column in which a name of each item and a set value of the item are displayed in correlation with each other.

Here, if the user presses (clicks on) Click to calibrate B0 of a set value column B0 correlated with the property CalRobotPlacePos (an example of the item) by using the input reception section 53, the display control unit 61 displays the first teaching screen described in step S100.

The display control unit 61 displays a result column Q2 on the setting screen illustrated in FIG. 6. The result column Q2 is a column which displays various information pieces which have already been detected and are taught to the control apparatus 30 on the basis of the captured image obtained by the imaging section 10, and is a column which displays a name of each item and a detection result for each item in correlation with each other.

Hereinafter, a description will be made assuming that the user presses the button B0 illustrated in FIG. 6 by using the input reception section 53 in step S90. Next, the display control unit 61 generates the first teaching screen on the basis of the user's operation (that is, an operation of pressing the button B0) which is input by using the input reception section 53 in step S90. The display control unit 61 controls the display section 55 to display the generated first teaching screen (step S100).

Figure 7:
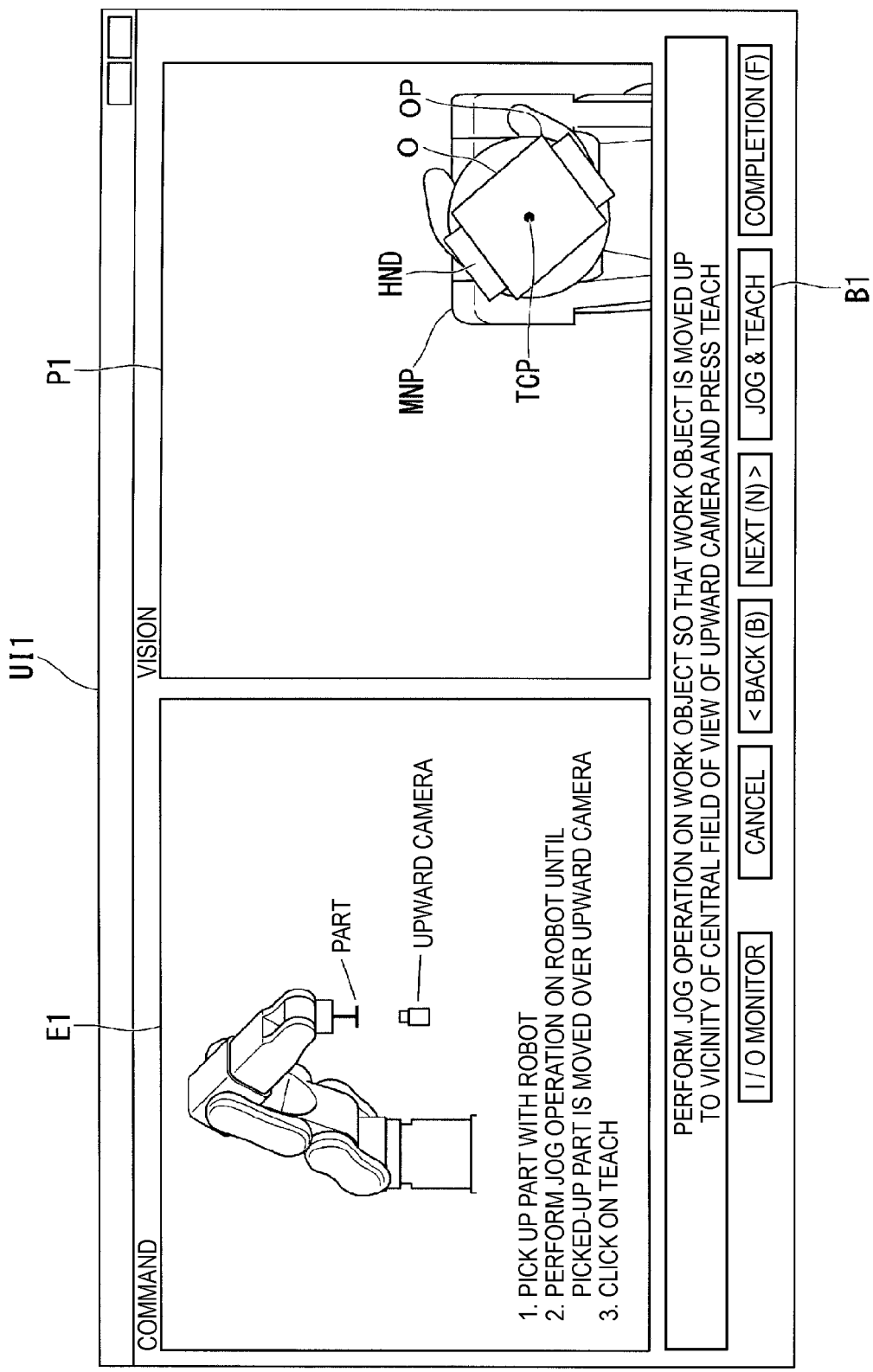
FIG. 7 is a diagram illustrating an example of a first teaching screen.

Next, the control section 60 of the teaching apparatus 5 receives a user's operation which is input via the first teaching screen by the input reception section 53 (step S110). Here, with reference to FIG. 7, the first teaching screen will be described. FIG. 7 is a diagram illustrating an example of the first teaching screen. The first teaching screen UI1 displays an explanation image E1 for showing procedures performed when the control apparatus 30 is taught via the first teaching screen UI1. If the user follows the explanation shown by the explanation image E1, the user can easily perform an operation for teaching the control apparatus 30 without reading a manual.

On the first teaching screen UI1, in addition to the explanation image E1, a captured image obtained by the imaging section 10 is displayed in a region P1. The display control unit 61 acquires the captured image obtained by the imaging section 10 from the image acquisition section 56 and displays the acquired captured image in the region P1. If the first teaching screen UI1 is displayed on the display section 55, the user presses a button B1 which is displayed on the first teaching screen UI1. Consequently, the user can perform an operation for teaching the control apparatus 30 according to the procedures having the content shown by the explanation image E1.

Figure 8:
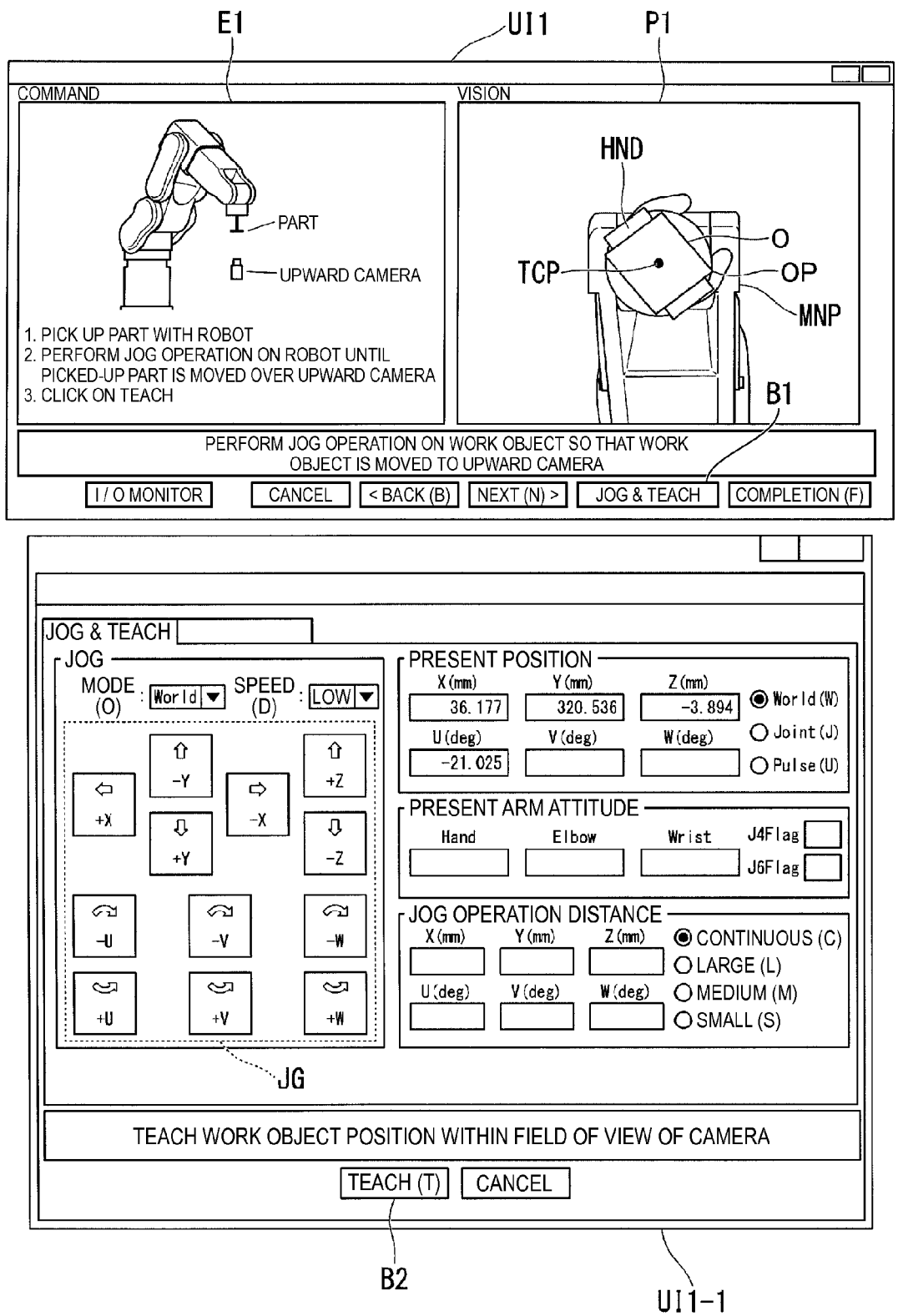
FIG. 8 is a diagram illustrating an example of the first teaching screen and a jog screen.

If the user presses the button B1, the display control unit 61 displays a jog screen UI1-1 as a sub-screen of the first teaching screen UI1 as illustrated in FIG. 8. FIG. 8 is a diagram illustrating an example of the first teaching screen UI1 and the jog screen UI1-1. A plurality of buttons for moving the control point of the gripping portion HND of the robot 20 to a position desired by the user are displayed in a region JG on the jog screen UI1-1. For example, a +X button is a button for moving the control point of the gripping portion HND in a positive direction of the X axis, and a −X button is a button for moving the control point of the gripping portion HND in a negative direction of the X axis.

In addition, a +Y button is a button for moving the control point of the gripping portion HND in a positive direction of the Y axis, and a −Y button is a button for moving the control point of the gripping portion HND in a negative direction of the Y axis. A +Z button is a button for moving the control point of the gripping portion HND in a positive direction of the Z axis, and a −Z button is a button for moving the control point of the gripping portion HND in a negative direction of the Z axis.

A +U button is a button for rotating the control point of the gripping portion HND in a positive direction about the X axis, and a −U button is a button for rotating the control point of the gripping portion HND in a negative direction about the X axis. A +V button is a button for rotating the control point of the gripping portion HND in a positive direction about the Y axis, and a −V button is a button for rotating the control point of the gripping portion HND in a negative direction about the Y axis. A +W button is a button for rotating the control point of the gripping portion HND in a positive direction about the Z axis, and a −W button is a button for rotating the control point of the gripping portion HND in a negative direction about the Z axis.

The display control unit 61 displays, for example, the present coordinates or the like in a robot coordinate system of the control point on the jog screen UI1-1. If the jog screen UI1-1 illustrated in FIG. 8 is displayed on the display section 55, the user causes the robot 20 to grip the work object O with the gripping portion HND according to the procedures shown by the explanation image E1 displayed on the first teaching screen UI1. The user causes the gripping portion HND of the robot 20 gripping the work object O to be moved to a predetermined imaging position. The user causes the robot 20 to grip the work object O with the gripping portion HND and to move the work object O to the predetermined imaging position through a jog operation via the jog screen UI1-1.

The user can check whether or not the work object O has been moved to the predetermined imaging position while viewing the captured image displayed in the region P1. Here, the predetermined imaging position is a position where the control point TCP of the gripping portion HND and the representative point OP of the work object O gripped by the gripping portion HND can be imaged by the imaging section 10.

Figure 9:
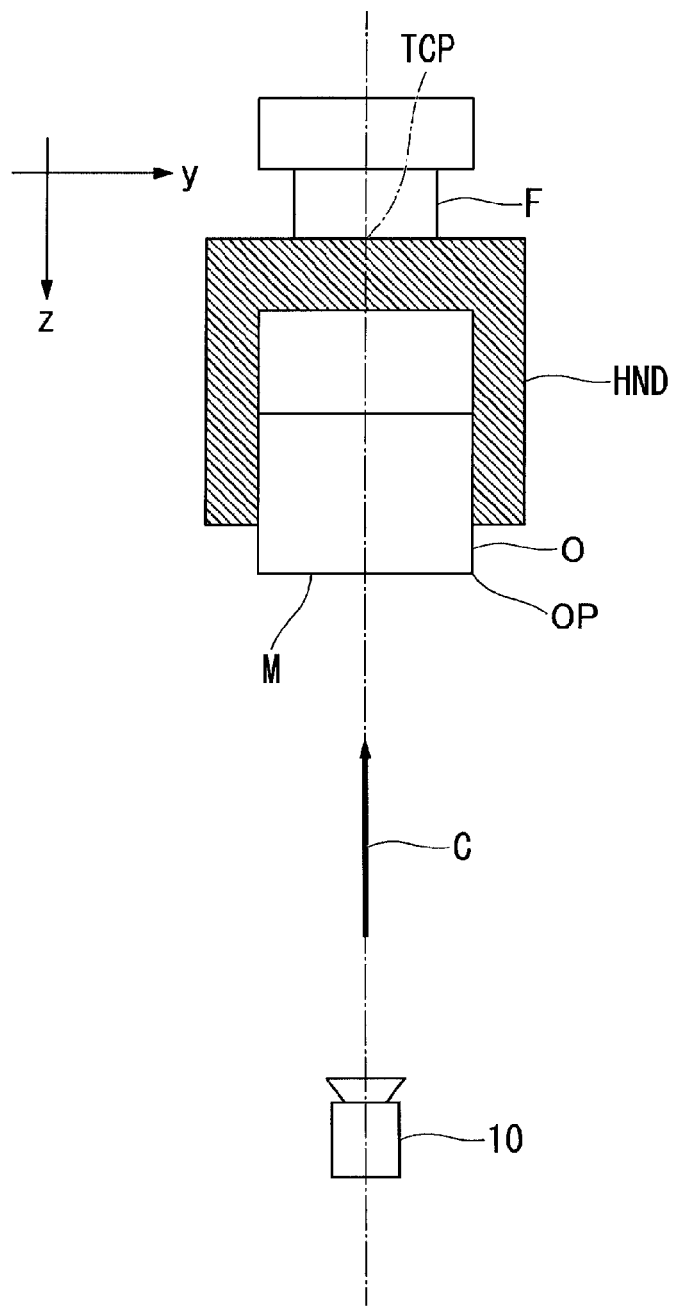
FIG. 9 is a diagram illustrating an example of a positional relationship between a work object and an imaging section at a predetermined imaging position.

Here, with reference to FIG. 9, the predetermined imaging position will be described. FIG. 9 is a diagram illustrating an example of a positional relationship between the work object O and the imaging section 10 at the predetermined imaging position. A state of the work object O gripped by the gripping portion HND in FIG. 9 is a state in which the work object O has been moved to the imaging position through a jog operation performed by the user. After the work object O has been moved to the imaging position, the imaging section 10 captures an image of an imaging possible range in a direction C illustrated in FIG. 9. The direction C is a direction perpendicular to a face M of the work object O gripped by the gripping portion HND. The face M is a face which opposes the flange F at which the gripping portion HND is provided when the work object O is gripped by the gripping portion HND. Therefore, the imaging section 10 captures an image of the imaging range in a state in which the face M is parallel to a plane of the imaging element.

The face M being made parallel to the plane of the imaging element is aimed at detecting an offset which is obtained when the work object O is disposed in the target area TA at an accurate position and attitude and is an offset between a control point position and attitude and a representative point position and attitude on a target area face (that is, on a plane of the table TB) when the control point TCP and the representative point OP are projected onto the target area face in the target area TA. As mentioned above, an offset is treated as an offset on the target area face, and thus computation cost of the teaching apparatus 5 or the control apparatus 30 can be minimized. Such offset treatment is only an example, and other offset treatment methods may be used.

The captured image of the work object O which has already been moved to the predetermined imaging position is displayed in the region P1 illustrated in FIG. 8. After the user causes the work object O to be moved to the predetermined imaging position, the user presses a teach button B2 on the jog screen UI1-1 illustrated in FIG. 8. If the user presses the teach button B2, the first calculation portion 63 captures an image which is being displayed on the first teaching screen UI1 when the teach button B2 is pressed, and detects a control point position and attitude and a work object position and attitude on the basis of an image processing method such as pattern matching on the basis of the captured image.

For example, the first calculation portion 63 detects a position of the control point TCP and an attitude of the control point TCP by performing pattern matching on the basis of shapes of the gripping portion HND and the manipulator MNP included in the captured image. In addition, the first calculation portion 63 detects a position of the representative point OP and an attitude of the representative point OP by performing the pattern matching on the basis of a shape of the work object O included in the captured image. The first teaching screen UI1 and the jog screen UI1-1 (that is, the screens illustrated in FIG. 8) are an example of a first screen.

After the user presses the teach button B2 and the control point position and attitude and the work object position and attitude are detected in step S110, the first calculation portion 63 calculates a reference offset on the basis of the detected work object position and attitude and the target point position and attitude (step S120). Here, after the reference offset is calculated, the display control unit 61 controls the display section 55 to erase the first teaching screen UI1 and the jog screen UI1-1. However, alternatively, the first teaching screen may not be erased until the user inputs an operation for erasing the first teaching screen UI1 and the jog screen UI1-1 by using the input reception section 53.

Next, the communication control unit 67 controls the communication section 54 to output (teach) information indicating the reference offset calculated in step S120 to the control apparatus 30 (step S130). Next, the display control unit 61 generates the second teaching screen on the basis of the user's operation which is input by using the input reception section 53. The display control unit 61 controls the display section 55 to display the generated second teaching screen (step S140).

Instead of the configuration in which the display control unit 61 generates the second teaching screen on the basis of the user's operation which is input by using the input reception section 53, the display control unit 61 may generate the second teaching screen when the information indicating the reference offset is output to the control apparatus 30 in step S130, or may generate the second teaching screen with erasure of the first teaching screen as a trigger.

Figure 10:
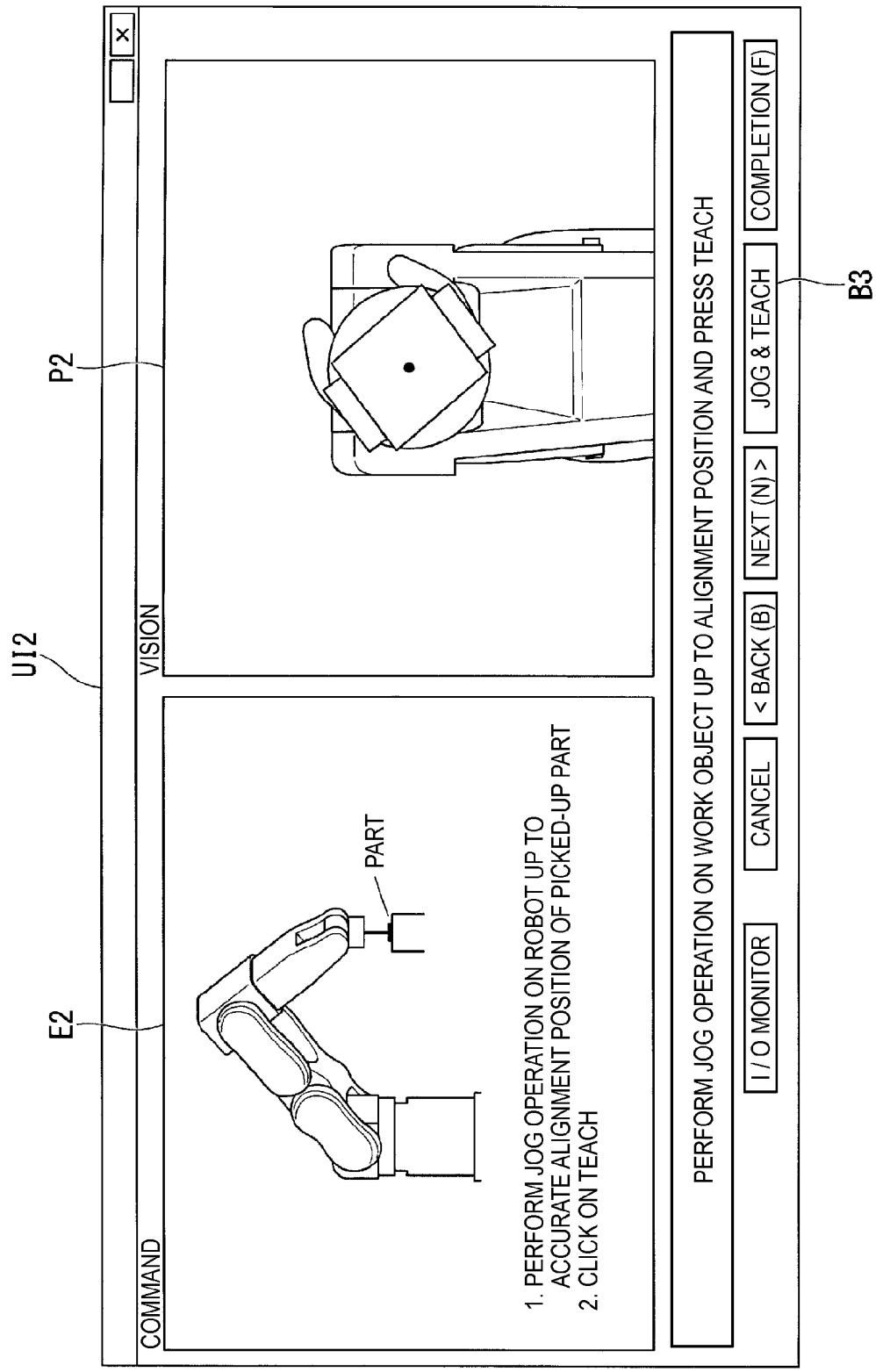
FIG. 10 is a diagram illustrating an example of a second teaching screen.

Next, the control section 60 of the teaching apparatus 5 receives a user's operation which is input via the second teaching screen by using the input reception section (step S150). Next, the second calculation portion 64 calculates a target point position and attitude on the basis of the received operation (step S160). Here, with reference to FIG. 10, a description will be made of the second teaching screen and processes in steps S140 to S160 related to the second teaching screen. FIG. 10 is a diagram illustrating an example of the second teaching screen.

The second teaching screen UI2 displays an explanation image E2 for showing procedures performed when the control apparatus 30 is taught via the second teaching screen UI2. If the user follows the explanation shown by the explanation image E2, the user can easily perform an operation for teaching the control apparatus 30 without reading a manual.

On the second teaching screen UI2, in addition to the explanation image E2, a captured image obtained by the imaging section 10 is displayed in a region P2. The display control unit 61 acquires the captured image obtained by the imaging section 10 from the image acquisition section 56 and displays the acquired captured image in the region P2. If the second teaching screen UI2 is displayed on the display section 55, the user presses a button B3 which is displayed on the second teaching screen UI2. Consequently, the user can perform an operation for teaching the control apparatus 30 according to the procedures having the content shown by the explanation image E2.

Figure 11:
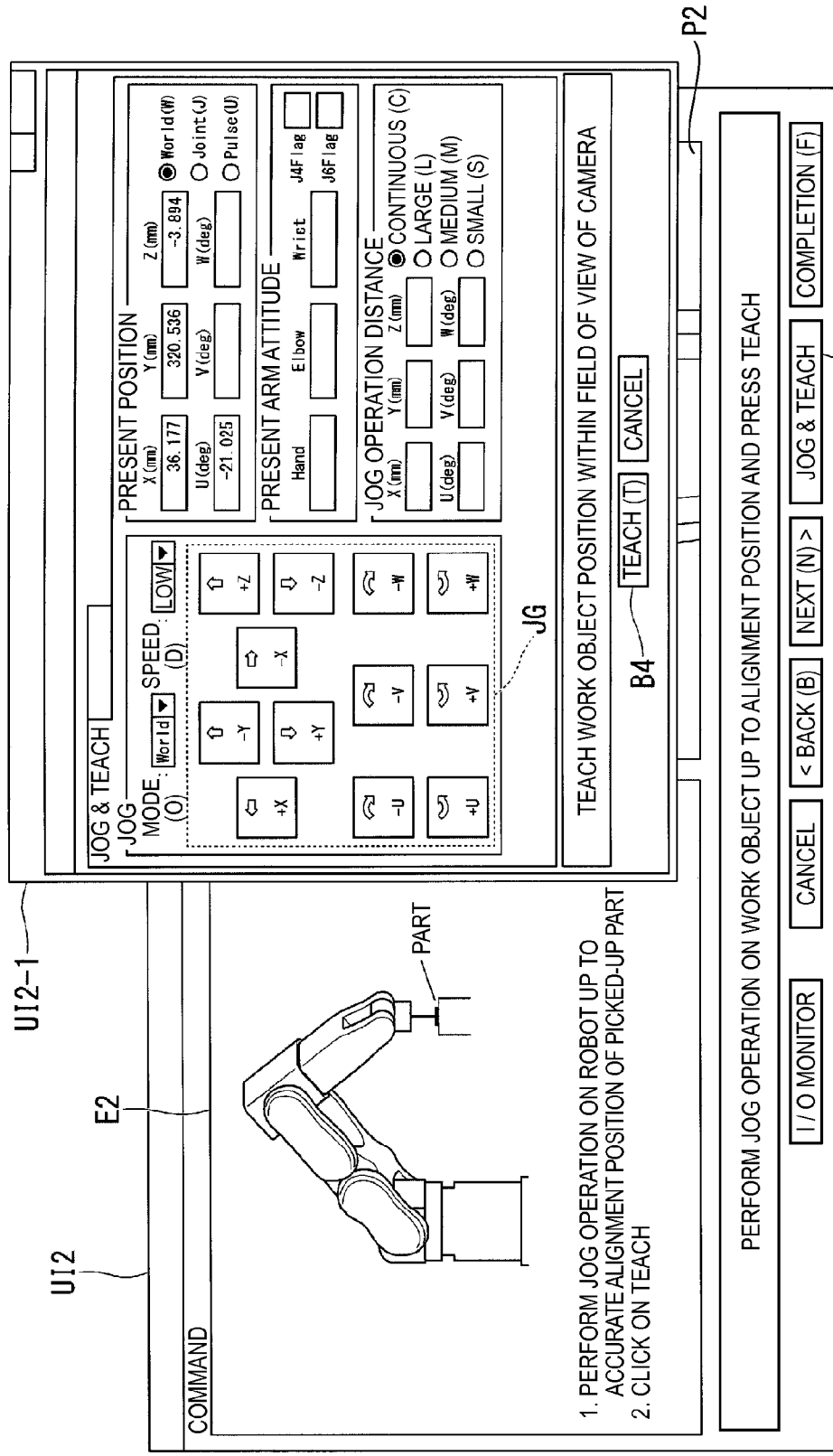
FIG. 11 is a diagram illustrating an example of the second teaching screen and a jog screen.

If the user presses the teach button B2, the display control unit 61 displays a jog screen UI2-1 as a sub-screen of the second teaching screen UI2 as illustrated in FIG. 11. FIG. 11 is a diagram illustrating an example of the second teaching screen UI2 and the jog screen UI2-1. The jog screen UI2-1 is the same as the jog screen UI1-1 and thus description thereof will be omitted.

If the jog screen UI2-1 illustrated in FIG. 11 is displayed on the display section 55, the work object O gripped by the gripping portion HND is moved to the target area TA through a jog operation via the jog screen UI2-1 according to the procedures shown by the explanation image E2 displayed on the second teaching screen UI2. The user matches the work object position and attitude with the target point position and attitude.

After the user matches the work object position and attitude with the target point position and attitude through a jog operation via the jog screen UI2-1, the user presses a teach button B4 on the jog screen UI2-1 illustrated in FIG. 11. If the user presses the teach button B4, the second calculation portion 64 acquires information indicating the control point position and attitude when the teach button B4 is pressed, from the control apparatus 30 as information indicating a control point target position and attitude. Then, the second calculation portion 64 calculates the target point position and attitude on the basis of the acquired control point target position and attitude and the reference offset calculated by the first calculation portion 63.

As mentioned above, the teaching apparatus 5 allows the user to move the work object O through a jog operation via the jog screen UI2-1 so as to be aligned at a target position where the work object O is actually disposed and at a target attitude, and calculates a target point position and attitude on the basis of the control point TCP and the above-described reference offset at the position and the attitude. Therefore, it is possible to teach the target point position and attitude to the control apparatus 30 with higher accuracy than, for example, in a case where the target point position and attitude are detected on the basis of a captured image. As a result, since the control apparatus 30 can calculate a control point target position and attitude with high accuracy when performing predetermined work, the robot 20 can perform highly accurate work.

On the second teaching screen U12, in addition to the explanation image E2, a captured image in the first teaching screen UI1 is displayed in the region P2. The display control unit 61 may acquire a captured image obtained by the imaging section 10 from the image acquisition section 56 and may display the acquired captured image in the region P2. The second teaching screen UI2 and the jog screen UI2-1 (that is, the screens illustrated in FIG. 11) are an example of a second screen.

Next, the communication control unit 67 controls the communication section 54 to output (teach) information indicating the target point position and attitude calculated in step S160 to the control apparatus 30 (step S170). Instead of the configuration in which the information indicating the reference offset is output to the control apparatus 30 in step S130, the communication control unit 67 may perform control so that the information indicating the reference offset is output to the control apparatus 30 along with the information indicating the target point position and attitude in step S170.

Figure 12:
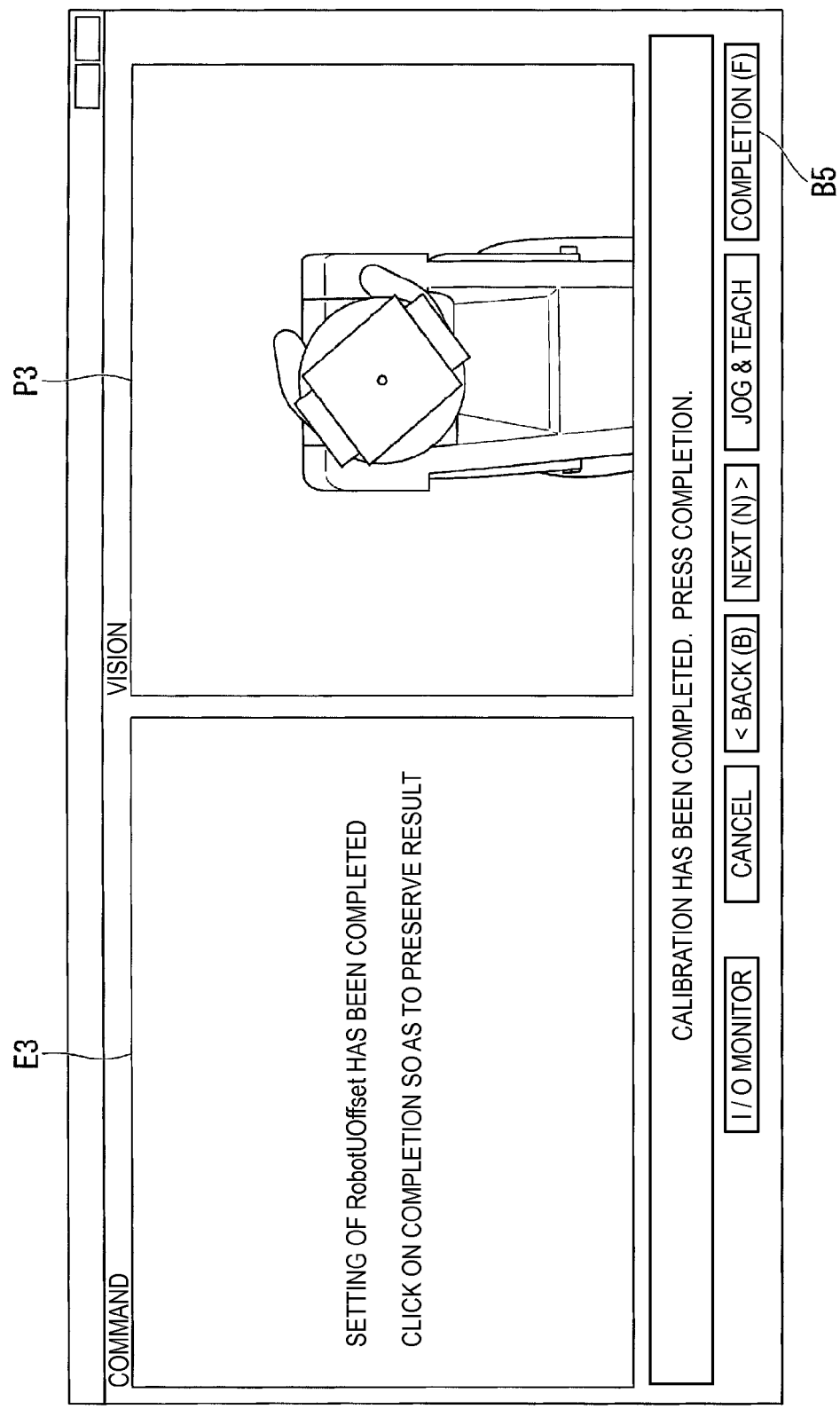
FIG. 12 is a diagram illustrating an example of a setting completion screen.

Next, the display control unit 61 generates a setting completion screen. The display control unit 61 controls the display section 55 to display the generated setting completion screen (step S180). Here, with reference to FIG. 12, the setting completion screen will be described. FIG. 12 is a diagram illustrating an example of the setting completion screen. The display control unit 61 displays an image or explanation for notifying that setting has been completed in a column E3 on the setting completion screen. As illustrated in FIG. 12, the display control unit 61 may display a captured image P3 obtained by the imaging section 10 on the setting completion screen but may not display the captured image. The display control unit 61 displays a completion button B5 on the setting completion screen. If the user presses the completion button B5, the display control unit 61 erases the setting completion screen.

The robot system 1 according to the present embodiment calculates a reference offset, a calculation offset, a target point position and attitude, and a control point target position and attitude by using the computation unit 62, but, alternatively, may calculate some or all of the reference offset, the calculation offset, the target point position and attitude, and the control point target position and attitude by using a separate apparatus. In this case, the teaching apparatus 5 requests the apparatus to calculate some or all of the reference offset, the calculation offset, the target point position and attitude, and the control point target position and attitude via the control apparatus 30.

As described above, in the robot system 1 according to the present embodiment, the user operates the first teaching screen UI1 for operating the robot so as to move the work object O into an imaging possible range of the imaging section 10 and the second teaching screen UI2 for moving the work object O so as to be aligned at a target point position and attitude by using the input reception section 53, and thus a work point target position and attitude are calculated by using a captured image obtained by the imaging section 10 capturing an image of the work object O and the target point position and attitude. Consequently, the robot system 1 can easily perform highly accurate teaching.

In the robot system 1, the first teaching screen UI1 includes the region P1 in which a captured image obtained by the imaging section 10 is displayed, and the second teaching screen UI2 includes the region P2 in which a captured image which is obtained by the imaging section 10 and is displayed on the first teaching screen UI1 is displayed. Consequently, the robot system 1 can provide the user with an environment in which the user moves the robot 20 through a jog operation while checking the captured image.

In the robot system 1, the first teaching screen UI1 includes the region in which work procedures are displayed and the second teaching screen UI2 includes the region in which work procedures are displayed. Consequently, the robot system 1 can reduce time and effort for the user to read a manual and thus allows the user to perform efficient work.

The robot system 1 calculates a reference offset between a target point position and attitude and a control point target position and attitude by using a captured image on the basis of an operation which is input via the first teaching screen UI1 by using the input reception section 53, acquires the target point position and attitude from the control apparatus 30 on the basis of an operation which is input via the second teaching screen UI2 by using the input reception section 53, and calculates the control point target position and attitude by using the calculated reference offset and the acquired target point position and attitude. Consequently, the robot system 1 can realize highly accurate work by calculating a calculation offset between the target point position and attitude and the control point target position and attitude for piece of work.

Second Embodiment

Outline

First, a summary of a robot system 101 according to the following embodiment will be described, and then the embodiment will be described in detail. In the present embodiment, the same constituent elements as in the first embodiment are given the same reference numerals, and description thereof will be omitted or will be made briefly.

Figure 13:
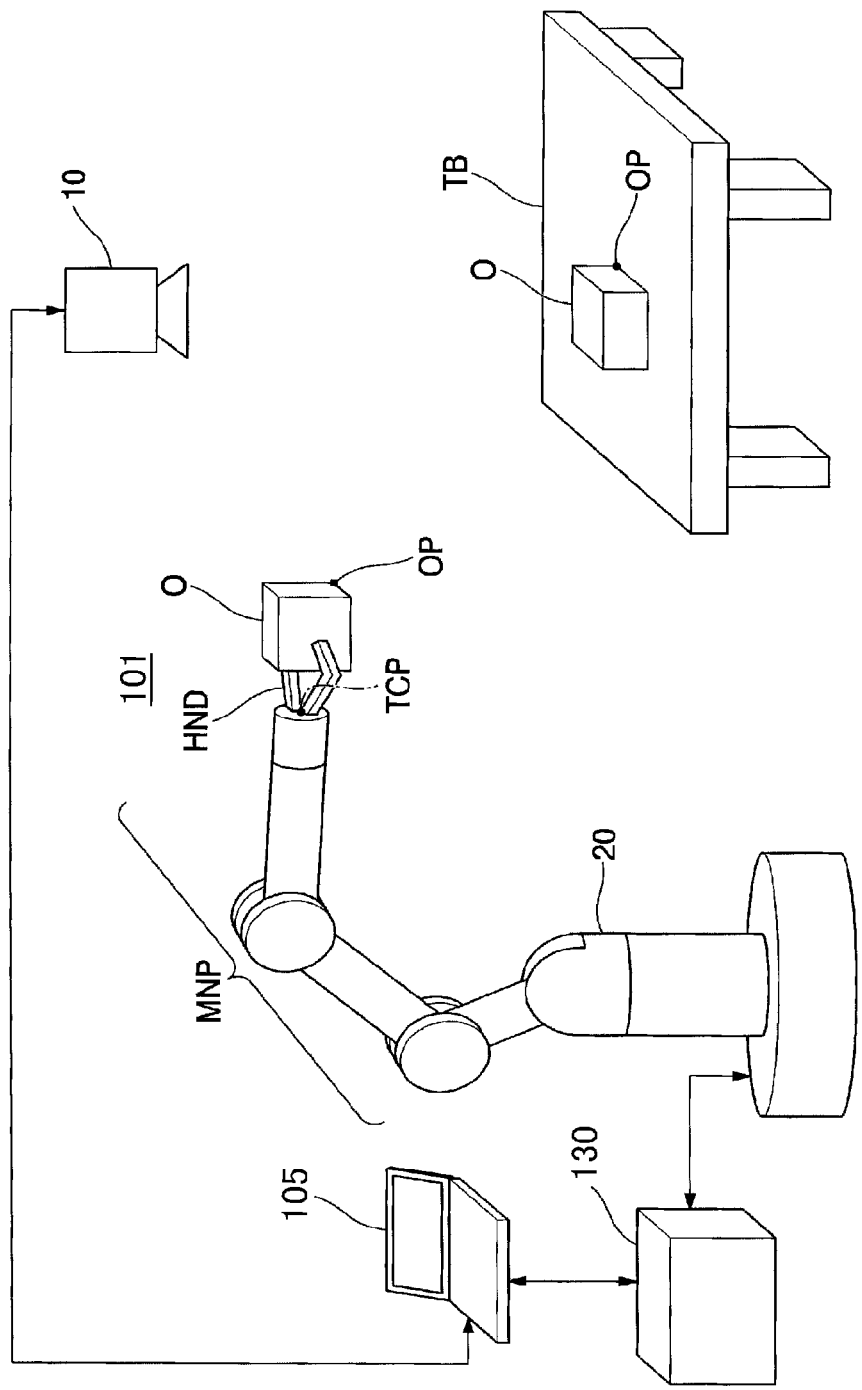
FIG. 13 is a diagram illustrating an example of a configuration of a robot system according to the present embodiment and also illustrating a state in which a robot performs predetermined work.

FIG. 13 is a diagram illustrating an example of a configuration of the robot system 101 according to the present embodiment and also illustrating an example of a state in which a robot 20 performs predetermined work. The robot system 101 includes a teaching apparatus 105, an imaging section 10, a single-arm robot 20 provided with a gripping portion HND (end effector) and a manipulator MNP, and a control apparatus 130. In the present embodiment, the single-arm robot indicates a robot having a single arm constituted by the gripping portion HND and the manipulator MNP.

Here, in the present embodiment, the predetermined work indicates that the robot 20 grips a work object O placed on a table TB with the gripping portion HND and disposes the gripped work object O at an arrangement position X which is registered in advance. The table TB is a stand on which the work object O is placed. The work object O is an object which can be gripped by the robot 20, and is an industrial part such as a nut, a bolt, a gear, or a tool, but is not limited thereto, and may be other objects as long as the objects can be gripped by the robot 20. In FIG. 13, the work object O is illustrated as a rectangular parallelepiped object.

In the robot system 101, the teaching apparatus 105 teaches reference information required for the robot 20 to perform predetermined work to the control apparatus 130 before the robot 20 performs the predetermined work. In the robot system 101, when the teaching apparatus 105 teaches the reference information to the control apparatus 130, an operation is received from the user via a graphical user interface (GUI) displayed on the teaching apparatus 105 and thus the reference information is taught to the control apparatus 130.

After the teaching apparatus 105 teaches the reference information to the control apparatus 130, the robot system 101 causes the robot 20 to perform the predetermined work. More specifically, the robot system 101 causes the imaging section 10 to capture an image of a range including the work object O. The robot system 101 detects (calculates) a position and an attitude of the work object O on the basis of the captured image obtained by the imaging section 10. Hereinafter, for convenience of description, a position and an attitude of the work object O are referred to as a work object position and attitude.

The robot system 101 detects a position and an attitude of a representative point OP which is set in the work object O in advance from the captured image obtained by the imaging section 10 as the work object position and attitude. The representative point OP of the work object O is a point which is set in the control apparatus 130 in advance, and is a feature point of the work object O and is one of corners of the work object O illustrated in FIG. 13 in this example. The corner is preferably a corner of a surface which is a bottom surface when the work object O is disposed at the arrangement position X in order to facilitate computation performed by the robot system 101. The work object O is an example of the work object.

The robot system 101 calculates a position and an attitude of the gripping portion HND right before the gripping portion HND of the robot 20 grips the work object O on the basis of the work object position and attitude detected from the captured image and the reference information taught by the teaching apparatus 105, and moves the gripping portion HND of the robot 20 so as to be aligned at the calculated position and attitude.

Here, the robot system 101 illustrated in FIG. 13 moves a position and an attitude (hereinafter, referred to as a control point position and attitude) of a control point TCP of the gripping portion HND as a position and an attitude of the gripping portion HND when the gripping portion HND of the robot 20 is moved. The control point TCP of the gripping portion HND indicates a position and an attitude of the gripping portion HND when the control apparatus 130 moves the gripping portion HND and the manipulator MNP of the robot 20, and indicates a central point (a tool center point) of a flange provided at an end of the manipulator MNP at which the gripping portion HND is provided in this example. Hereinafter, for convenience of description, a position and an attitude of the gripping portion HND right before the work object O is gripped are referred to as a control point target position and attitude.

After the gripping portion HND of the robot 20 is moved so as to match the control point position and attitude of the gripping portion HND with the control point target position and attitude (that is, right before the work object O is gripped), the robot system 101 causes the gripping portion HND of the robot 20 to grip the work object O. The robot system 101 causes the robot 20 to dispose the work object O gripped by the gripping portion HND at the arrangement position X.

Hereinafter, detailed description will be made of teaching performed by the teaching apparatus 105. In the robot system 101, the teaching apparatus 105 teaches the reference information to the control apparatus 130, and then predetermined work is repeatedly performed on a plurality of work objects O. When the predetermined work is repeatedly performed, the robot system 101 causes the imaging section 10 to capture an image of the work object O every time the predetermined work is performed (that is, every time a new work object O is placed on the table TB, or for each newly detected work object O), calculates a work object position and attitude on the basis of the captured image, and calculates a new control point target position and attitude for gripping the work object O on the basis of the calculated work object position and attitude and the reference information taught by the teaching apparatus 105.

Figure 14:
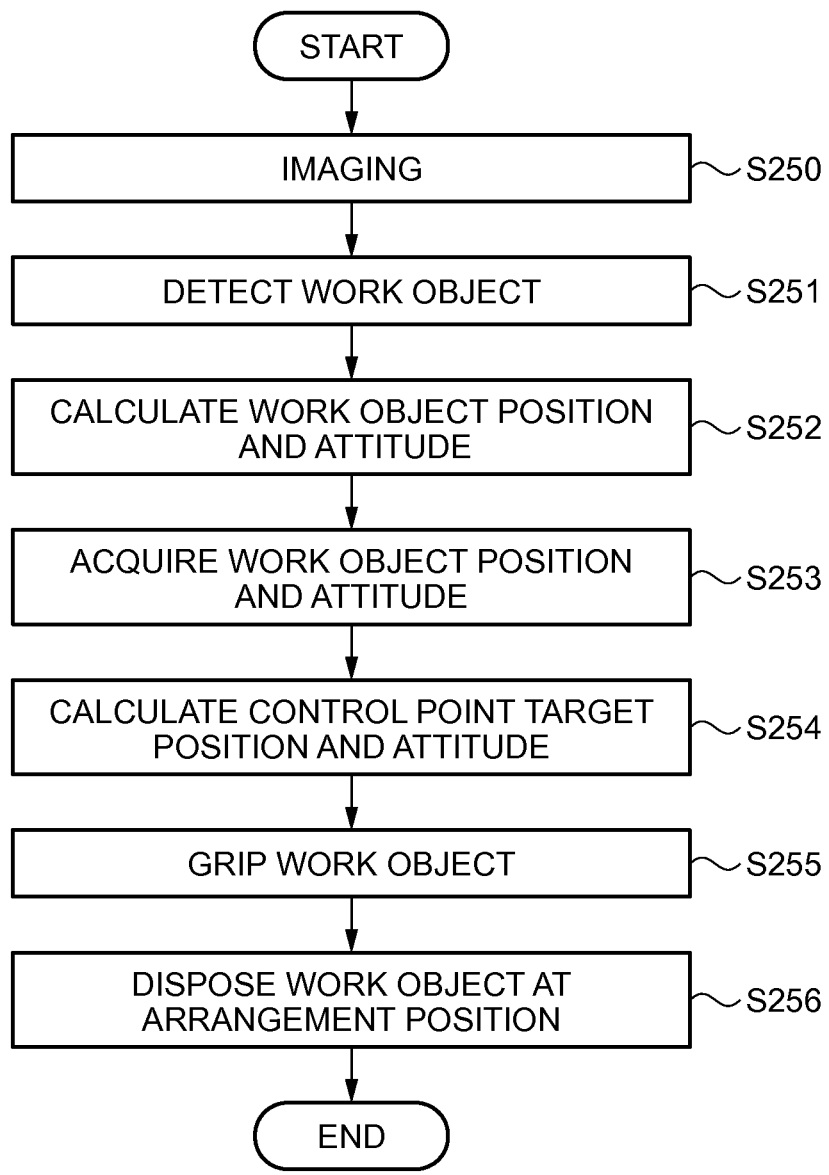
FIG. 14 is a flowchart illustrating an example of a flow of a process related to predetermined work performed by each device included in the robot system.

Here, with reference to FIG. 14, a description will be made of a process related to predetermined work performed by each device included in the robot system 101. FIG. 14 is a flowchart illustrating an example of a process related to predetermined work performed by each device included in the robot system 101. First, the control apparatus 130 causes the imaging section 10 to capture an image via the teaching apparatus 105 (step S250). Next, the teaching apparatus 105 detects the work object O on the basis of the captured image obtained by the imaging section 10 (step S251). Next, the control apparatus 130 calculates a position and an attitude of the detected work object O (that is, a work object position and attitude) (step S252). The teaching apparatus 105 outputs the calculated work object position and attitude to the control apparatus 130.

Next, the control apparatus 130 acquires the work object position and attitude from the teaching apparatus 105 (step S253). Next, the control apparatus 130 calculates a control point target position and attitude on the basis of the work object position and attitude acquired in step S253 and the reference information taught by the teaching apparatus 105 (step S254). Next, the control apparatus 130 causes the robot 20 to grip the work object O on the basis of the calculated control point target position and attitude (step S255). Next, the control apparatus 130 controls the robot 20 so that the work object O is disposed at the arrangement position X (step S256).

Embodiment

Hereinafter, an embodiment of the invention will be described with reference to the drawings. As described above, the robot system 101 according to the present embodiment illustrated in FIG. 13 includes the teaching apparatus 105, the imaging section 10, the robot 20, and the control apparatus 130.

The teaching apparatus 105 is, for example, a notebook personal computer (PC), but may alternatively be a desktop PC, a tablet PC, a mobile phone terminal, a multi-function mobile phone terminal (smartphone), a personal digital assistant (PDA), or the like. The teaching apparatus 105 is communicably connected to the imaging section 10 via a cable. Wired communication using the cable is realized by a standard such as Ethernet (registered trademark) or a universal serial bus (USB). The teaching apparatus 105 may be connected to the imaging section 10 by using wireless communication realized by a communication standard such as Wi-Fi (registered trademark).

The teaching apparatus 105 acquires a captured image from the imaging section 10. A dedicated application is installed in the teaching apparatus 105 which displays a GUI for realizing the application. The teaching apparatus 105 receives an operation from a user via the GUI, and detects a work object position and attitude of the work object O as a work object reference position and attitude on the basis of the received operation and the captured image acquired from the imaging section 10.

If the user moves the gripping portion HND through a jog operation, the teaching apparatus 105 realizes a state which is desired by the user and is obtained right before the gripping portion HND grips the work object O, then receives an operation from the user via the GUI, and acquires information indicating a control point position and attitude from the control apparatus 130 as information indicating a control point target position and attitude. The teaching apparatus 105 calculates an offset between the work object reference position and attitude and the control point target position and attitude as a reference offset based on the acquired control point target position and attitude and the detected work object reference position and attitude. The teaching apparatus 105 outputs (teaches) the calculated reference offset and information indicating the work object reference position and attitude to the control apparatus 130 as reference information.

A jog knob for performing a jog operation may be provided in the teaching apparatus 105 and may be provided in the control apparatus 130. In a case where the jog knob is provided in the teaching apparatus 105, the teaching apparatus 105 moves the robot 20 through a jog operation via the control apparatus 130. The teaching apparatus 105 may output the information only indicating the work object reference position and attitude to the control apparatus 130 as the reference information.

In this case, the control apparatus 130 calculates a reference offset on the basis of the acquired (taught) work object reference position and attitude and a control point target position and attitude which are stored therein, and stores again the work object reference position and attitude as reference information along with the calculated reference offset. Hereinafter, a description will be made assuming that the teaching apparatus 105 outputs the information indicating the work object reference position and attitude and the reference offset to the control apparatus 130 as reference information.

When the robot system 101 causes the robot 20 to perform predetermined work, the teaching apparatus 105 causes the imaging section 10 to capture an image of a range including the work object O in response to a request from the control apparatus 130. The teaching apparatus 105 detects a work object position and attitude on the basis of the captured image. The teaching apparatus 105 detects the work object position and attitude for each piece of the predetermined work in response to a request from the control apparatus 130. The teaching apparatus 105 outputs information indicating the detected work object position and attitude to the control apparatus 130 as detection information.

Instead of the configuration of outputting information indicating the detected work object position and attitude to the control apparatus 130 as detection information, the teaching apparatus 105 may acquire reference information from the control apparatus 130, and may calculate a control point target position and attitude on the basis of the acquired reference information and the detected work object position and attitude. In this case, the teaching apparatus 105 outputs information indicating the calculated control point target position and attitude to the control apparatus 130.

The imaging section 10 is a camera including, for example, a charge coupled device (CCD) or a complementary metal oxide semiconductor (CMOS) which is an imaging element converting collected light into an an electric signal. The imaging section 10 is a monocular camera, but may be formed of two or more cameras such as a stereo camera.

The imaging section 10 is communicably connected to the teaching apparatus 105 via a cable. Wired communication using the cable is realized by a standard such as Ethernet (registered trademark) or a USB. The imaging section 10 may be connected to the teaching apparatus 105 by using wireless communication realized by a communication standard such as Wi-Fi (registered trademark). The imaging section 10 and the teaching apparatus 105 may be formed not separately from each other but integrally with each other. The imaging section 10 is provided at a position where a range (hereinafter, referred to as an imaging range) including the work object O and capable of imaging the representative point OP of the work object O can be imaged. The imaging section 10 captures a moving image as a captured image, but may alternatively capture a still image, or a still image and a moving image as a captured image. The imaging section 10 is an example of an imaging device.

The robot 20 is a single-arm robot including, for example, the gripping portion HND, the manipulator MNP, and a plurality of actuator (not illustrated). The robot 20 may be a SCARA robot (horizontally articulated robot) or a dual-arm robot instead of the single-arm robot. The SCARA robot is a robot of which a manipulator is moved only in a horizontal direction, and only a slide shaft at a front end of the manipulator is moved in a vertical direction. The dual-arm robot is a robot including two arms each of which is constituted by the gripping portion HND and the manipulator MNP.

The arm of the robot 20 is of a six-axis vertically articulated type, and can perform an operation of a six-axial degree of freedom through interlocking operations among the support stand, the manipulator MNP, and the gripping portion HND using the actuators. The arm of the robot 20 may operate in five or less degrees of freedom (five axes) or may operate in seven or more degrees of freedom (seven axes). Hereinafter, a description will be made of an operation of the robot 20, performed by the arm including the gripping portion HND and the manipulator MNP. The gripping portion HND of the robot 20 is provided with claws which can grip an object.

The robot 20 is communicably connected to the control apparatus 130 via, for example, a cable. Wired communication using the cable is realized by a standard such as Ethernet (registered trademark) or a USB. The robot 20 may be connected to the control apparatus 130 by using wireless communication realized by a communication standard such as Wi-Fi (registered trademark). In the robot system 101, the robot 20 is configured to be connected to the control apparatus 130 which is provided outside the robot 20 as illustrated in FIG. 13, but the control apparatus 130 may be built into the robot 20 instead of this configuration.

The robot 20 acquires a control signal generated by the control apparatus 130, and moves the gripping portion HND and the manipulator MNP of the robot 20 on the basis of the acquired control signal.

In response to a request from the teaching apparatus 105, the control apparatus 130 outputs, to the teaching apparatus 105, information indicating a control point position and attitude (that is, a control point target position and attitude) obtained when a state is realized which is desired by the user and is obtained right before the gripping portion HND grips the work object O through a user's jog operation. Then, the control apparatus 130 acquires reference information from the teaching apparatus 105.

When the robot system 101 causes the robot 20 to perform predetermined work, the control apparatus 130 causes the teaching apparatus 105 to detect a work object position and attitude on the basis of a captured image which is acquired by the teaching apparatus 105. The control apparatus 130 acquires information indicating the work object position and attitude detected by the teaching apparatus 105 as detection information. The control apparatus 130 calculates a control point target position and attitude during the predetermined work on the basis of the reference information and the detection information.

The control apparatus 130 causes the robot 20 to move the gripping portion HND so that a control point position and attitude match the calculated control point target position and attitude, and causes the gripping portion HND to grip the work object O so that a state (that is, relative position and attitude which are indicated by a reference offset and are formed between the work object O and the gripping portion HND) of the same offset as the reference offset taught by the user is realized. The control apparatus 130 controls the robot 20 so that the work object O gripped by the gripping portion HND is disposed at the arrangement position X.

A hardware configuration of the teaching apparatus 105 is the same as the hardware configuration of the teaching apparatus 5 described with reference to FIG. 3 in the first embodiment, and thus description thereof will be omitted here.

Figure 15:
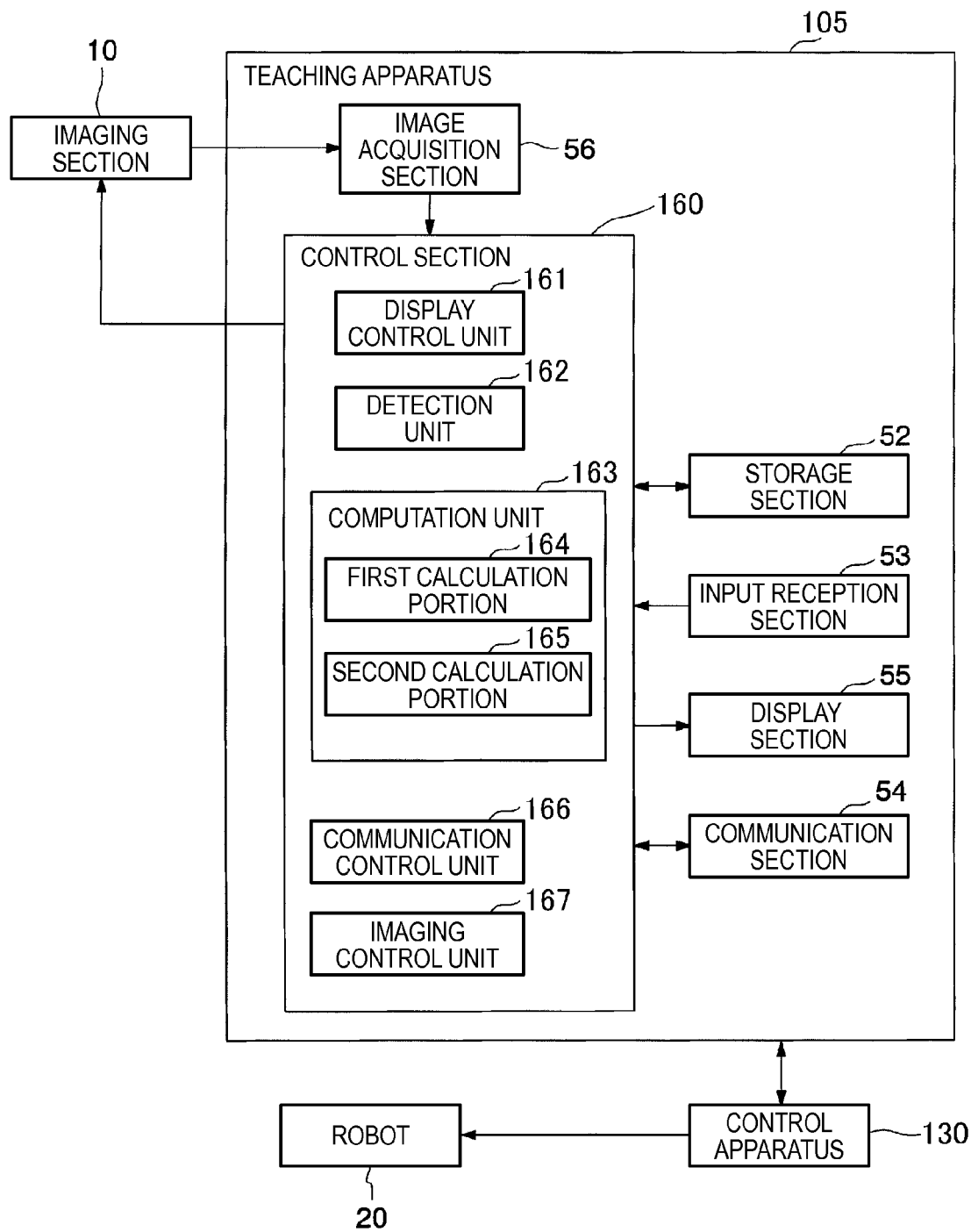
FIG. 15 is a diagram illustrating an example of a functional configuration of a teaching apparatus.

Next, with reference to FIG. 15, a functional configuration of the teaching apparatus 105 will be described. FIG. 15 is a diagram illustrating an example of a functional configuration of the teaching apparatus 105. The teaching apparatus 105 includes the storage section 52, the input reception section 53, the communication section 54, the display section 55, an image acquisition section 56, and a control section 160. Some or all function units included in the control section 160 are realized by, for example, the CPU 51 executing the various programs stored in the storage section 52. In addition, some or all of the function units may be hardware function units such as a large scale integration (LSI) circuit or an application specific integrated circuit (ASIC).

The image acquisition section 56 acquires a captured image from the imaging section 10. The image acquisition section 56 outputs the acquired captured image to the control section 160.

The control section 160 includes a display control unit 161, a detection unit 162, a computation unit 163, a communication control unit 166, and an imaging control unit 167. The control section 160 controls the entire teaching apparatus 105.

The display control unit 161 generates a GUI for detecting a work object reference position and attitude on the basis of the acquired captured image, and displays the generated GUI. More specifically, the display control unit 161 generates a screen (GUI) for detecting the work object reference position and attitude as a first teaching screen on the basis of a user's operation which is input by using the input reception section 53. The display control unit 161 controls the display section 55 so as to display the generated first teaching screen. The display control unit 161 generates a screen for calculating a reference offset as a second teaching screen. The display control unit 161 controls the display section 55 to display the second teaching screen on the basis of a user's operation which is input by using the input reception section 53.

The detection unit 162 acquires a captured image obtained by the imaging section 10 from the image acquisition section 56 on the basis of a user's operation which is input via the first teaching screen by using the input reception section 53. The detection unit 162 detects a work object position and attitude on the basis of the acquired captured image. If the work object position and attitude is detected, the detection unit 162 stores the detected work object position and attitude in the storage section 52 as a work object reference position and attitude.

The computation unit 163 includes a first calculation portion 164 and a second calculation portion 165.

The first calculation portion 164 acquires a control point position and attitude from the control apparatus 130 as a control point target position and attitude via the communication section 54 controlled by the communication control unit 166 on the basis of a user's operation which is input via the second teaching screen by using the input reception section 53. The first calculation portion 164 calculates a reference offset on the basis of the control point target position and attitude acquired from the control apparatus 130 and the work object position and attitude detected by the detection unit 162. If the reference offset is calculated, the first calculation portion 164 stores the calculated reference offset in the storage section 52.

The second calculation portion 165 calculates a control point target position and attitude on the basis of the work object position and attitude detected by the detection unit 162 and the work object reference position and attitude and the reference offset stored in the storage section 52 in response to a request from the control apparatus 130. The control section 160 may not include the second calculation portion 165.

The communication control unit 166 controls the communication section 54 so that the control point position and attitude is acquired from the control apparatus 130 on the basis of a user's operation which is input by using the input reception section 53 via the second teaching screen which is displayed on the display section 55 by the display control unit 161. The communication control unit 166 controls the communication section 54 so that information indicating the work object reference position and attitude detected by the detection unit 162 and information indicating the reference offset calculated by the first calculation portion 164 are output to the control apparatus 130 on the basis of a user's operation which is input by using the input reception section 53 via the second teaching screen which is displayed on the display section 55 by the display control unit 161. The communication control unit 166 causes the control point target position and attitude calculated by the second calculation portion 165 to be output to the control apparatus 130 in response to a request from the control apparatus 130.

The imaging control unit 167 controls the imaging section 10 to capture an image of an imaging possible range.

Figure 16:
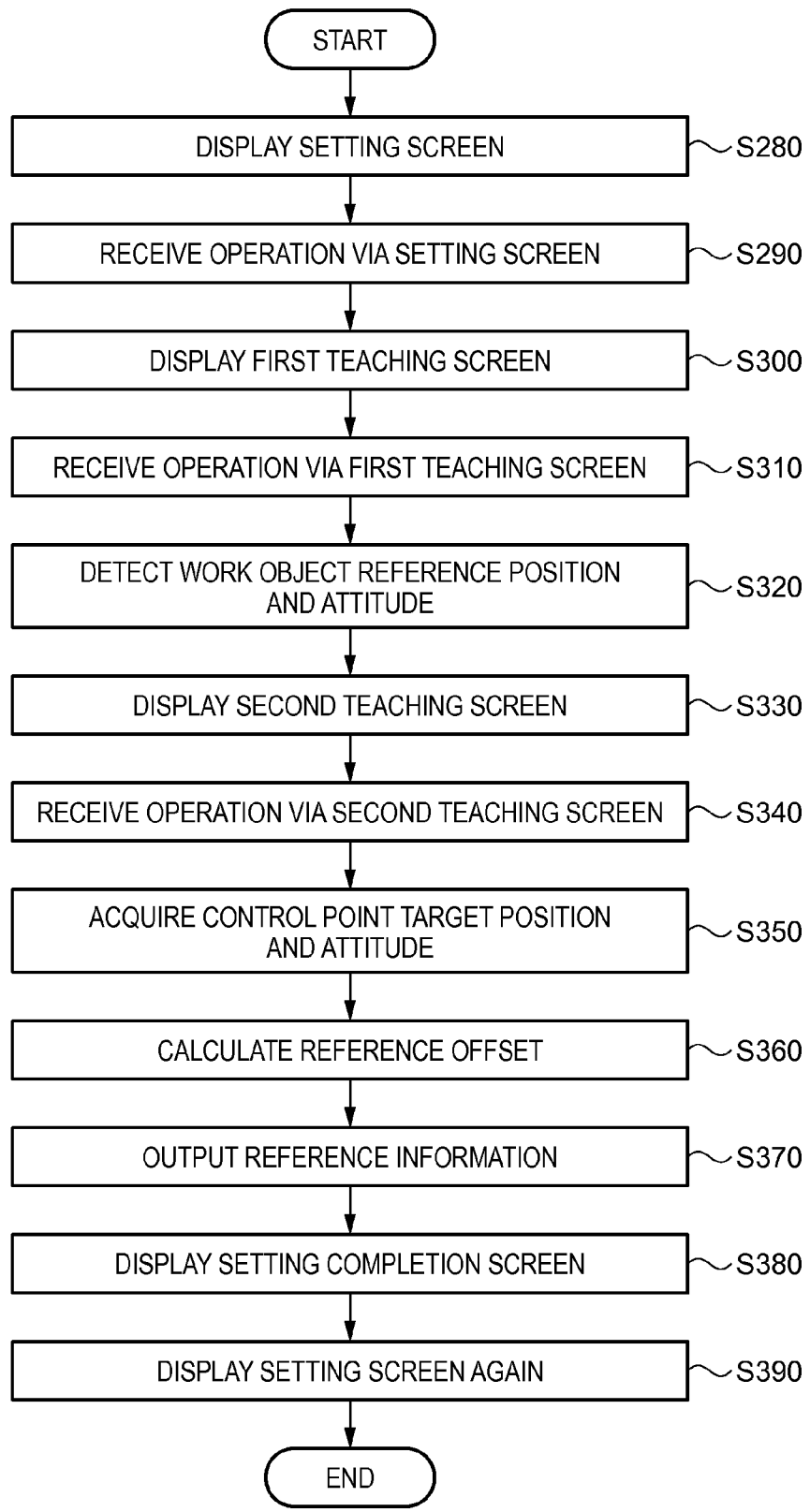
FIG. 16 is a flowchart illustrating an example of a flow of a process in which the teaching apparatus teaches reference information to a control apparatus.
Figure 17:
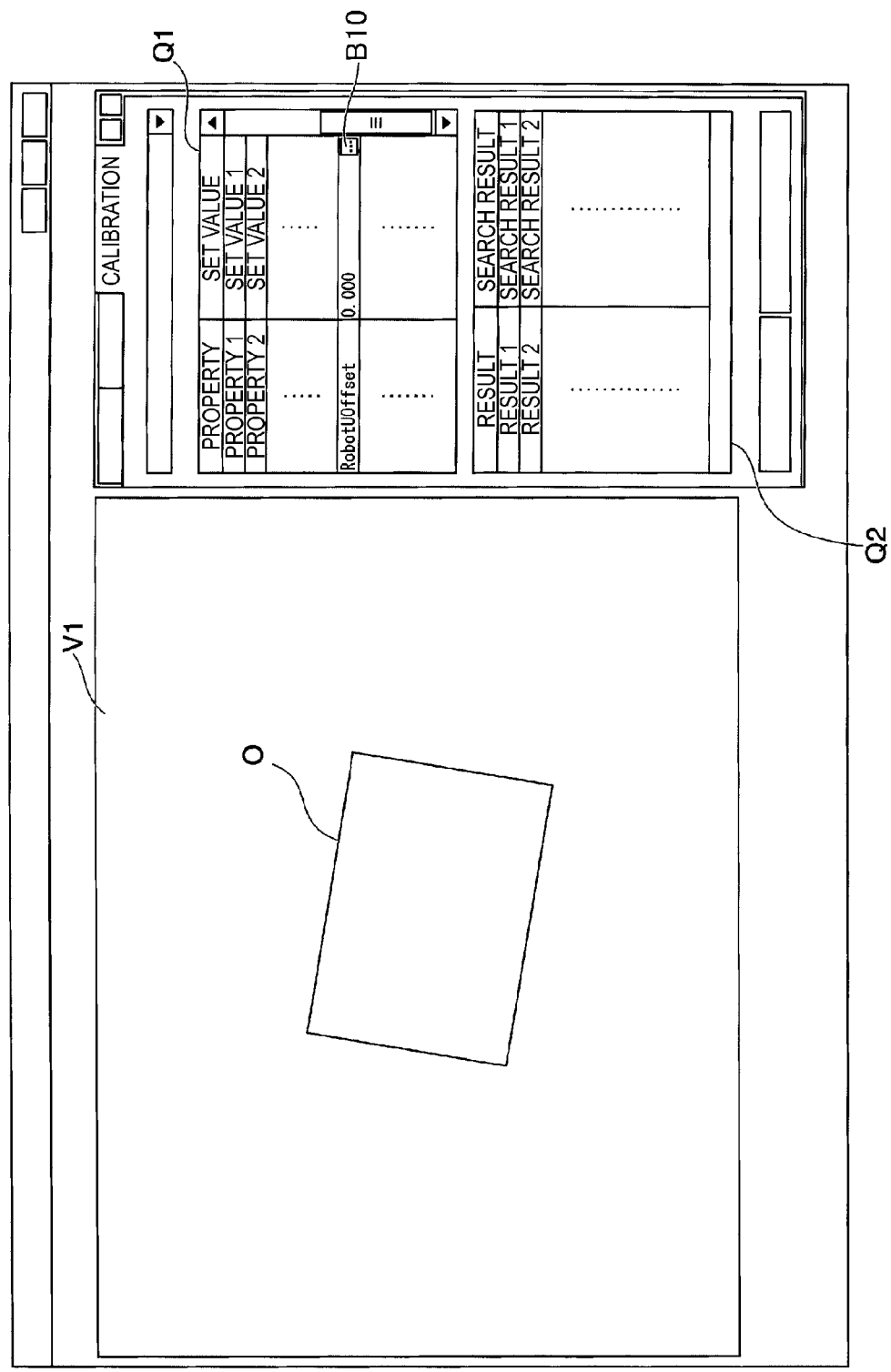
FIG. 17 is a diagram illustrating an example of a setting screen.

Hereinafter, with reference to FIG. 16, a description will be made of a process in which the teaching apparatus 105 teaches the reference information to the control apparatus 130. FIG. 16 is a flowchart illustrating an example of a flow of a process in which the teaching apparatus 105 teaches the reference information to the control apparatus 130. First, the display control unit 161 displays a setting screen on the basis of a user's operation which is input by using the input reception section 53 (step S280). Next, the control section 160 of the teaching apparatus 105 receives a user's operation which is input via the setting screen by using the input reception section 53 (step S290). Here, with reference to FIG. 17, the setting screen will be described. FIG. 17 is a diagram illustrating an example of the setting screen.

The display control unit 161 acquires a captured image obtained by the imaging section 10 from the image acquisition section 56, and displays the acquired captured image in a region V1. The display control unit 161 displays a property column Q1 on the setting screen illustrated in FIG. 17. The property column Q1 is a column which displays a list of items which can be taught to the control apparatus 130 by the teaching apparatus 105 and is a column in which a name of each item and a set value of the item are displayed in correlation with each other.

For example, if the user selects the property RobotUOffset (an example the item) by using the input reception section 53, a button B10 is displayed in a set value column correlated therewith. When the user presses (clicks on) the button B10 by using the input reception section 53, the display control unit 161 displays the first teaching screen described in step S300.

The display control unit 161 displays a result column Q2 on the setting screen illustrated in FIG. 17. The result column Q2 is a column which displays various information pieces which have already been detected and are taught to the control apparatus 130 on the basis of the captured image obtained by the imaging section 10, and is a column which displays a name of each item and a detection result for each item in correlation with each other.

Hereinafter, a description will be made assuming that the user presses the button B10 illustrated in FIG. 17 by using the input reception section 53 in step S290. Next, the display control unit 161 generates the first teaching screen on the basis of the user's operation (that is, an operation of pressing the button B10) which is input by using the input reception section 53 in step S290. The display control unit 161 controls the display section 55 to display the generated first teaching screen (step S300).

Figure 18:
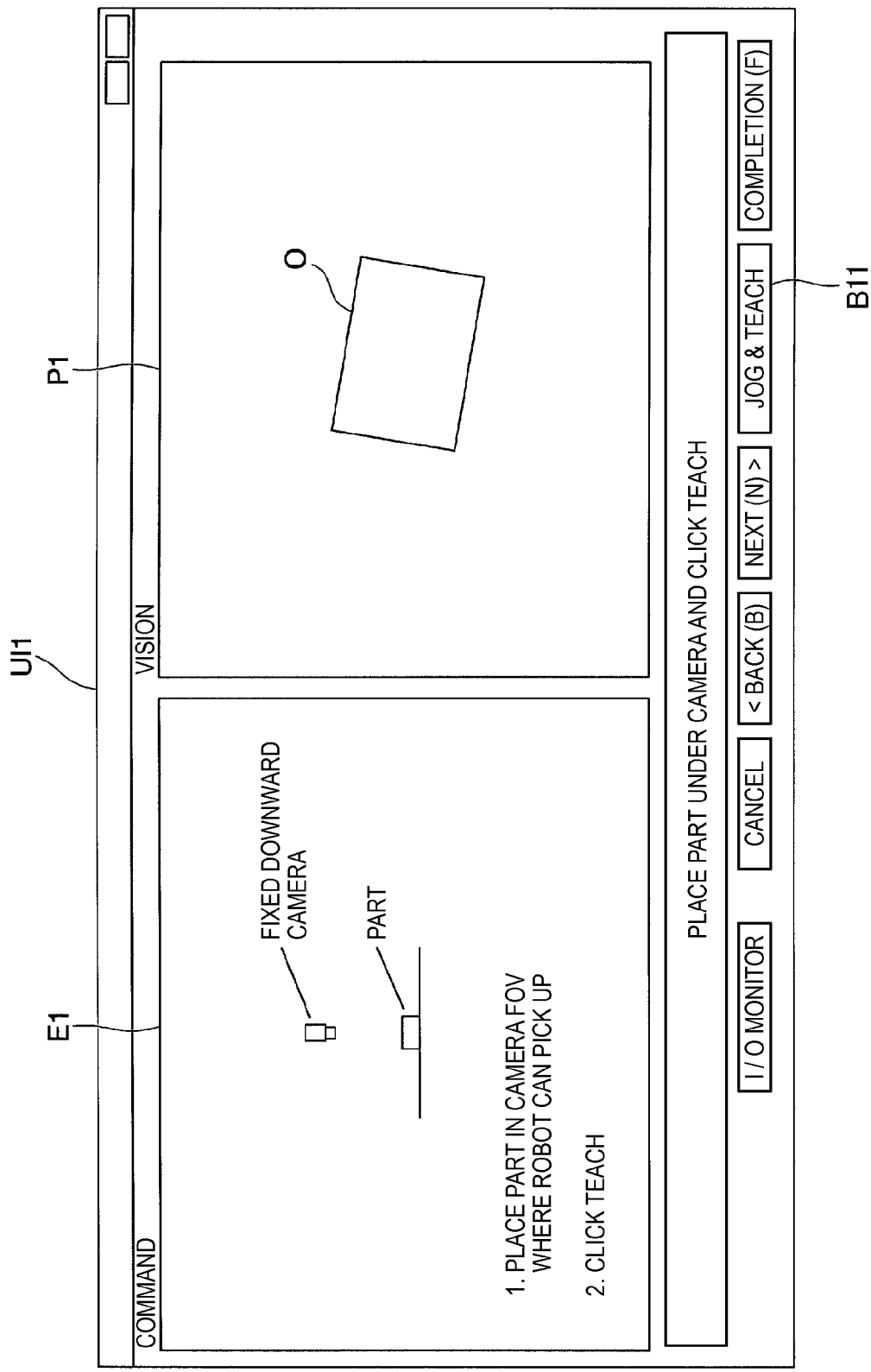
FIG. 18 is a diagram illustrating an example of a first teaching screen.

Next, the control section 160 of the teaching apparatus 105 receives a user's operation which is input via the first teaching screen by the input reception section 53 (step S310). Next, the first calculation portion 164 detects a work object reference position and attitude on the basis of the received operation (step S320). Here, with reference to FIG. 18, a description will be made of the first teaching screen and processes in steps S300 to S320 related to the first teaching screen. FIG. 18 is a diagram illustrating an example of the first teaching screen.

If a first teaching screen UI1 illustrated in FIG. 18 is displayed on the display section 55, the user causes the work object O to be placed in a range which can be imaged by the imaging section 10 according to procedures shown by an explanation image E1 displayed on the first teaching screen UI1. The imaging section 10 starts to capture an image right after the first teaching screen UI1 is displayed, but may alternatively start to capture an image on the basis of a user's operation which is input via the first teaching screen UI1 by using the input reception section 53.

On the first teaching screen UI1, in addition to the explanation image E1, a captured image obtained by the imaging section 10 is displayed in a region P1. The display control unit 161 acquires the captured image obtained by the imaging section 10 from the image acquisition section 56 and displays the acquired captured image in the region P1. The user can cause the work object O to be placed in the range which can be imaged by the imaging section 10 while checking the captured image displayed in the region P1. The first teaching screen UI1 is an example of a first screen.

The captured image of the work object O which has already been placed in the region which can be imaged by the imaging section 10 is displayed in the region P1 illustrated in FIG. 18. After the user causes the work object O to be placed in the region which can be imaged by the imaging section 10, the user presses (clicks on) a teach button B11 illustrated in FIG. 18. If the user presses the teach button B11, the detection unit 162 captures an image which is being displayed on the first teaching screen UI1 when the teach button B11 is pressed, and detects a work object position and attitude as a work object reference position and attitude on the basis of an image processing method such as pattern matching on the basis of the captured image.

Figure 19:
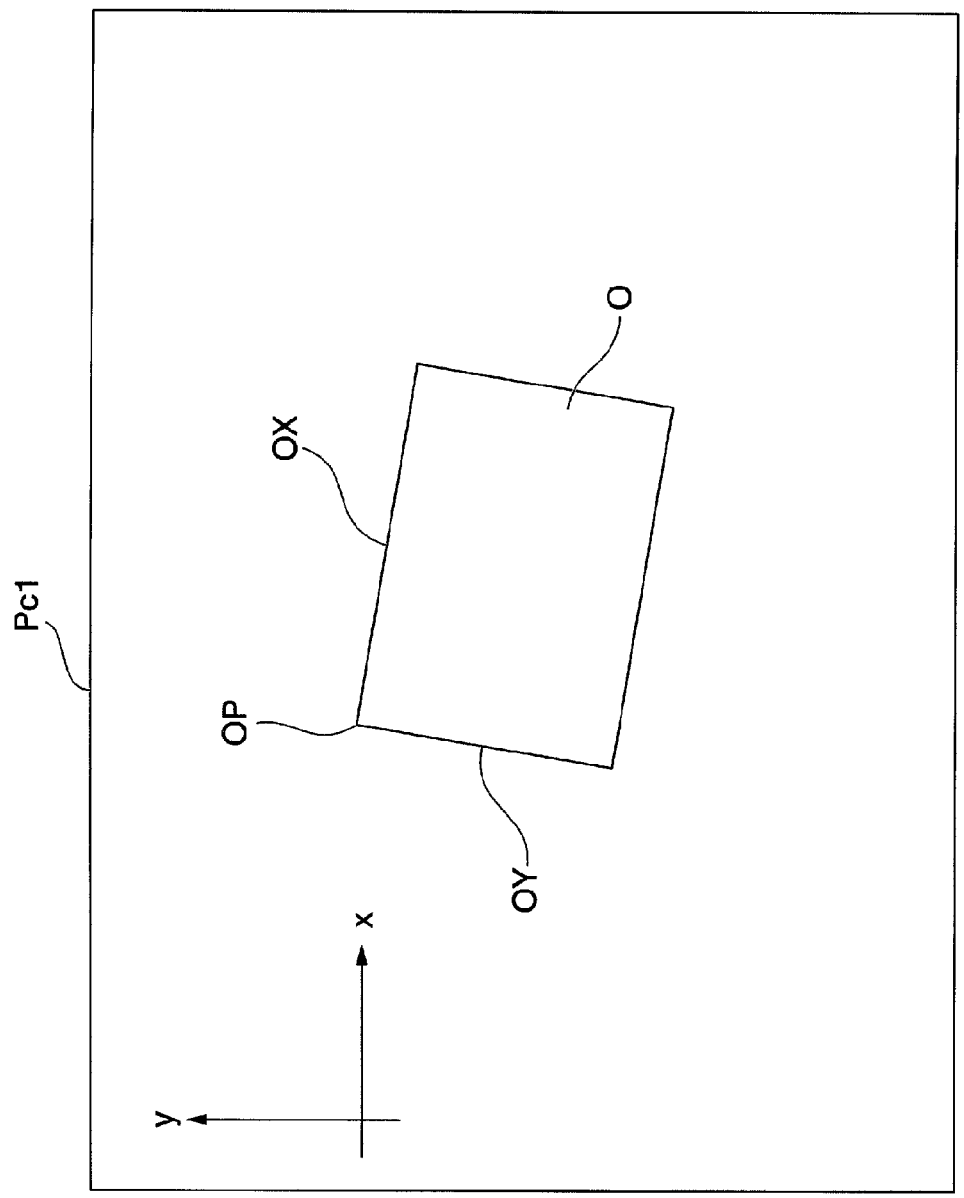
FIG. 19 is a diagram illustrating an example of an image captured by a detection unit on the basis of an operation which is received by an input reception unit via the first teaching screen.

For example, the detection unit 162 detects a position of the work object O on the captured image and an attitude of the work object O on the captured image by performing pattern matching on the basis of a shape of the work object O included in the captured image. Here, with reference to FIG. 19, a description will be made of a process of detecting the work object reference position and attitude, performed by the detection unit 162. FIG. 19 is a diagram illustrating an example of an image captured by the detection unit 162 on the basis of an operation which is input via the first teaching screen UI1 by using the input reception section 53.

A captured image Pc1 is an example of an image captured by the detection unit 162. In FIG. 19, directions on the captured image Pc1 are represented by an X axis and a Y axis illustrated in FIG. 19. Specifically, a horizontal direction of the captured image Pc1 illustrated in FIG. 19 is set as an X direction, and a vertical direction thereof is set as a Y direction. The detection unit 162 detects a position of the representative point OP of the work object O as a work object reference position from the captured image Pc1 through pattern matching on the basis of the shape of the work object O.

The detection unit 162 detects, for example, a side OX and a side OY which extend from the representative point OP of the work object O, from the captured image Pc1 through the pattern matching on the basis of the shape of the work object O, and sets the extension direction of the side OX as an X direction of the representative point OP and the extension direction of the side OY as a Y direction of the representative point OP. The detection unit 162 detects the X direction and the Y direction of the representative point OP having the representative point OP as an origin as a work object reference attitude. The detection unit 162 stores the detected work object reference position and attitude in the storage section 52.

Next, the display control unit 161 generates the second teaching screen on the basis of a user's operation which is input by using the input reception section 53. The display control unit 161 controls the display section 55 to display the generated second teaching screen (step S330). Instead of the configuration in which the display control unit 161 generates the second teaching screen on the basis of the user's operation which is input by using the input reception section 53, the display control unit 161 may generate the second teaching screen when the work object reference position and attitude are detected by the detection unit 162 in step S320, or may generate the second teaching screen with erasure of the first teaching screen as a trigger.

Next, the control section 160 of the teaching apparatus 105 receives a user's operation which is input via the second teaching screen by using the input reception section 53 (step S340). Next, the first calculation portion 164 acquires a control point target position and attitude from the control apparatus 130 on the basis of the received operation (step S350). Next, the first calculation portion 164 reads the work object reference position and attitude from the storage section 52, and calculates a reference offset on the basis of the read work object reference position and attitude and the control point target position and attitude acquired in step S350 (step S360).

Figure 20:
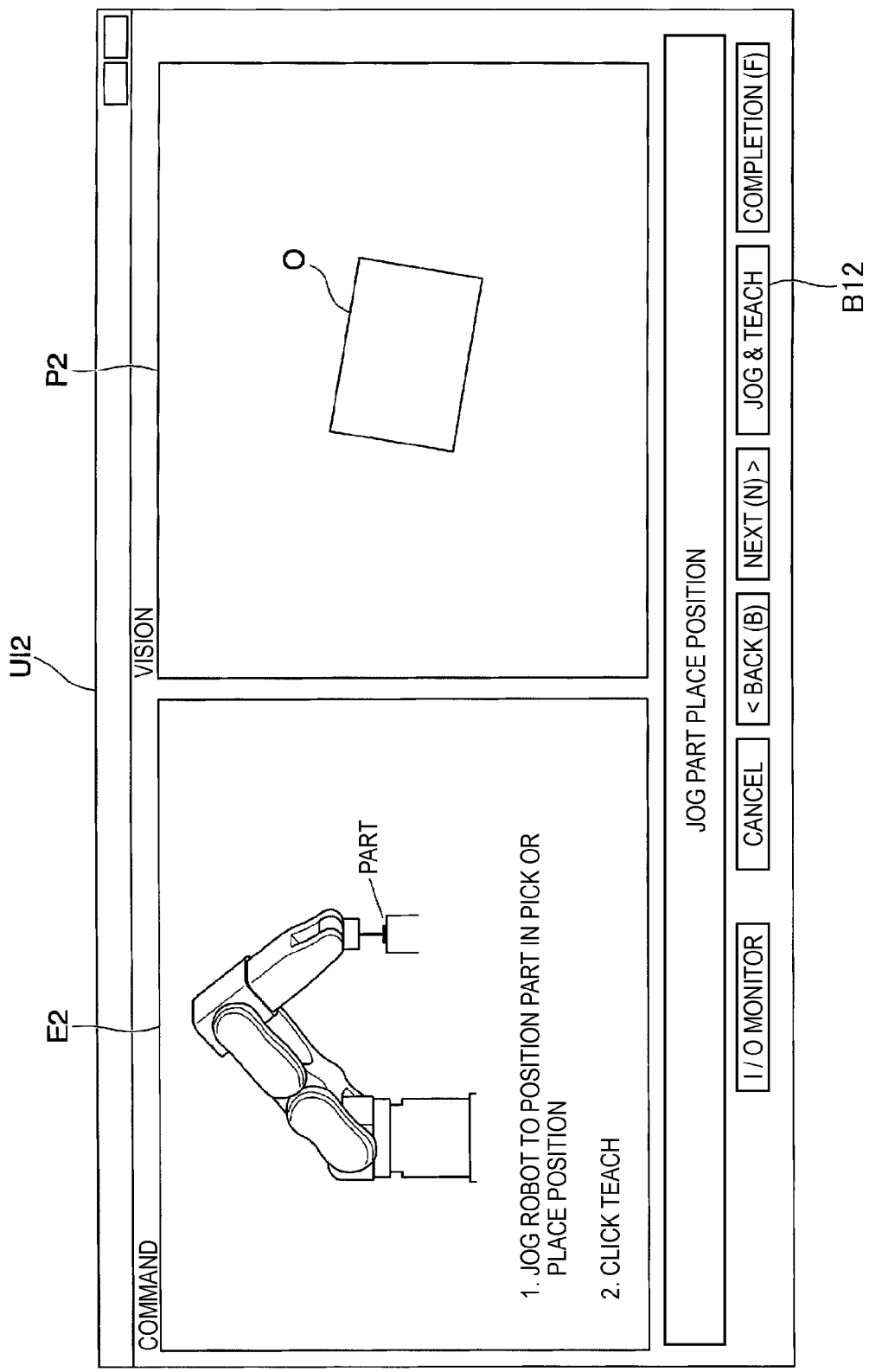
FIG. 20 is a diagram illustrating an example of a second teaching screen.

Here, with reference to FIG. 20, a description will be made of the second teaching screen and processes in steps S340 to S360 related to the second teaching screen. FIG. 20 is a diagram illustrating an example of the second teaching screen. If a second teaching screen UI2 illustrated in FIG. 20 is displayed on the display section 55, the user causes the robot 20 to grip the work object O with the gripping portion HND according to procedures shown by an explanation image E2 displayed on the second teaching screen UI2. The user causes the robot 20 to grip the work object O with the gripping portion HND through a jog operation.

The second teaching screen UI2 displays an explanation image E2 for showing procedures performed when the control apparatus 130 is taught via the second teaching screen UI2. If the user follows the explanation shown by the explanation image E2, the user can easily perform an operation for teaching the control apparatus 130 without reading a manual.

On the second teaching screen UI2, in addition to the explanation image E2, a captured image obtained by the imaging section 10 is displayed in a region P2. The display control unit 161 acquires the captured image obtained by the imaging section 10 from the image acquisition section 56 and displays the acquired captured image in the region P2. If the second teaching screen UI2 is displayed on the display section 55, the user presses a teach button B12 which is displayed on the second teaching screen UI2. Consequently, the user can perform an operation for teaching the control apparatus 130 according to the procedures having the content shown by the explanation image E2.

Figure 21:
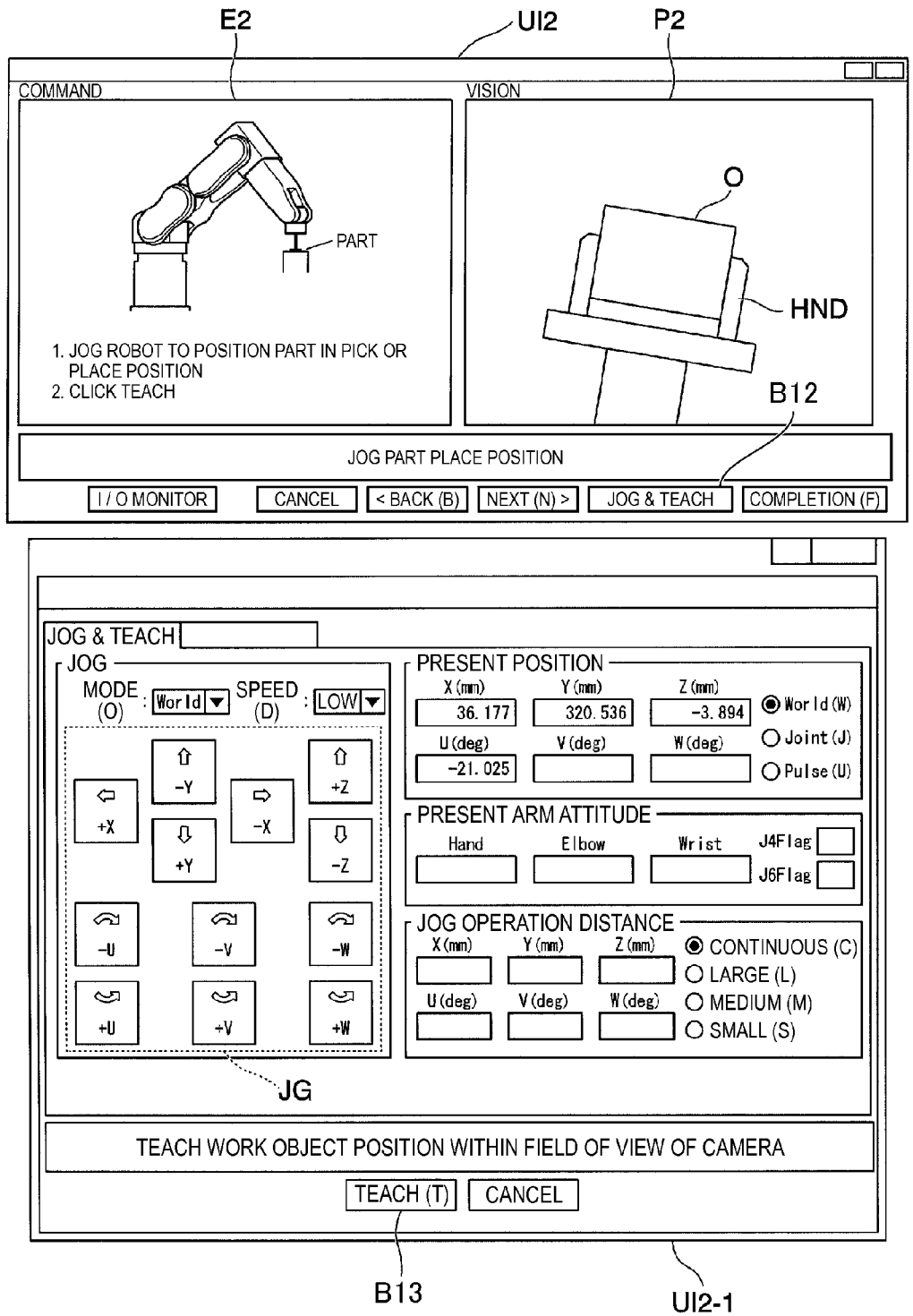
FIG. 21 is a diagram illustrating an example of the second teaching screen and a jog screen.

If the user presses the teach button B12, the display control unit 161 displays a jog screen UI2-1 as a sub-screen of the second teaching screen UI2 as illustrated in FIG. 21. FIG. 21 is a diagram illustrating an example of the second teaching screen UI2 and the jog screen UI2-1. A plurality of buttons for moving the control point of the gripping portion HND of the robot 20 to a position desired by the user are displayed in a region JG on the jog screen UI2-1. For example, a +X button is a button for moving the control point of the gripping portion HND in a positive direction of the X axis, and a −X button is a button for moving the control point of the gripping portion HND in a negative direction of the X axis.

In addition, a +Y button is a button for moving the control point of the gripping portion HND in a positive direction of the Y axis, and a −Y button is a button for moving the control point of the gripping portion HND in a negative direction of the Y axis. A +Z button is a button for moving the control point of the gripping portion HND in a positive direction of the Z axis, and a −Z button is a button for moving the control point of the gripping portion HND in a negative direction of the Z axis.

A +U button is a button for rotating the control point of the gripping portion HND in a positive direction about the X axis, and a −U button is a button for rotating the control point of the gripping portion HND in a negative direction about the X axis. A +V button is a button for rotating the control point of the gripping portion HND in a positive direction about the Y axis, and a −V button is a button for rotating the control point of the gripping portion HND in a negative direction about the Y axis. A +W button is a button for rotating the control point of the gripping portion HND in a positive direction about the Z axis, and a −W button is a button for rotating the control point of the gripping portion HND in a negative direction about the Z axis.

The display control unit 161 displays, for example, the present coordinates or the like in a robot coordinate system of the control point on the jog screen UI2-1. The display control unit 161 displays the captured image obtained by the imaging section 10 in the region P2 of the second teaching screen UI2. The user can cause the work object O to be gripped by the gripping portion HND through a jog operation via the jog screen UI2-1 while checking the captured image. A captured image of a state in which the work object O is gripped by the gripping portion HND through the jog operation via the jog screen UI2-1 is displayed in the region P2 of the second teaching screen UI2 illustrated in FIG. 21. The display control unit 161 may display a captured image in the region P2 on the basis of an operation which is input via the first teaching screen UI1 by using the input reception section 53. The second teaching screen UI2 and the jog screen UI2-1 (that is, the screens illustrated in FIG. 21) are an example of a second screen.

After the user causes the work object O to be gripped by the gripping portion HND of the robot 20 through the jog operation via the jog screen UI2-1, the user presses (clicks on) a teach button B13 on the jog screen UI2-1 illustrated in FIG. 21. If the user presses the teach button B13, the first calculation portion 164 acquires information indicating a control point position and attitude obtained when the teach button B13 is pressed, from the control apparatus 130 as information indicating a control point target position and attitude.

As mentioned above, in the teaching apparatus 105, the user causes the work object O to be actually gripped through a jog operation via the jog screen UI2-1, and acquires a control point position and attitude at a position and an attitude where the work object O is gripped by the gripping portion HND, as a control point target position and attitude. Therefore, it is possible to acquire the control point target position and attitude with higher accuracy than, for example, in a case where the control point target position and attitude are detected on the basis of a captured image. After the control point target position and attitude are acquired from the control apparatus 130, the first calculation portion 164 reads a work object position and attitude from the storage section 52 and calculates a reference offset on the basis of the read work object reference position and attitude and the acquired control point target position and attitude.

Figure 22:
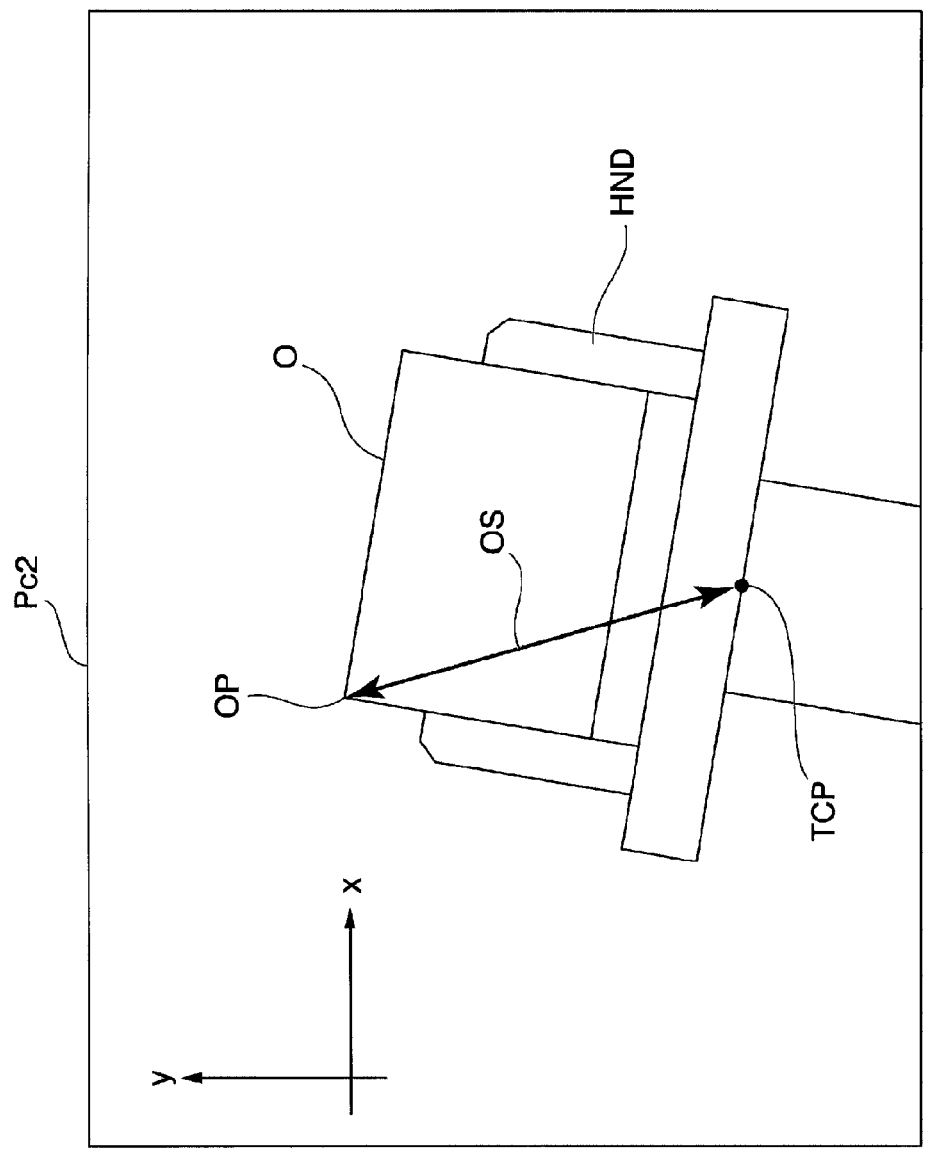
FIG. 22 is a diagram illustrating an example of a captured image which is displayed in a region of the second teaching screen and is obtained when a work object is gripped by a gripping portion through a jog operation.

Here, with reference to FIG. 22, a description will be made of a process of acquiring the control point target position and attitude and a process of calculating the reference offset in the first calculation portion 164. FIG. 22 is a diagram illustrating an example of a captured image which is displayed in the region P2 of the second teaching screen UI2 and is obtained when the work object O is gripped by the gripping portion HND through a jog operation.

A captured image Pc2 is an example of an image obtained when the work object O is gripped by the gripping portion HND. In FIG. 22, directions on the captured image Pc2 are represented by an X axis and a Y axis illustrated in FIG. 22. Specifically, a horizontal direction of the captured image Pc2 illustrated in FIG. 22 is set as an X direction, and a vertical direction thereof is set as a Y direction. The first calculation portion 164 acquires a control point position and attitude obtained in the state illustrated in FIG. 22 from the control apparatus 130 as a control point target position and attitude.

Therefore, the teaching apparatus 105 can acquire the more highly accurate control point target position and attitude by using the captured image Pc2 than in a case of detecting the control point target position and attitude through pattern matching or the like. The first calculation portion 164 reads the work object reference position and attitude from the storage section 52, and calculates a reference offset OS illustrated in FIG. 22 on the basis of the read work object reference position and attitude and the acquired control point target position and attitude.

Next, the communication control unit 166 controls the communication section 54 to output (teach) information indicating the work object reference position and attitude detected in step S320 and information indicating the reference offset calculated in step S360 to the control apparatus 130 (step S370). Next, the display control unit 161 generates a setting completion screen. The display control unit 161 controls the display section 55 to display the generated setting completion screen (step S380).

Figure 23:
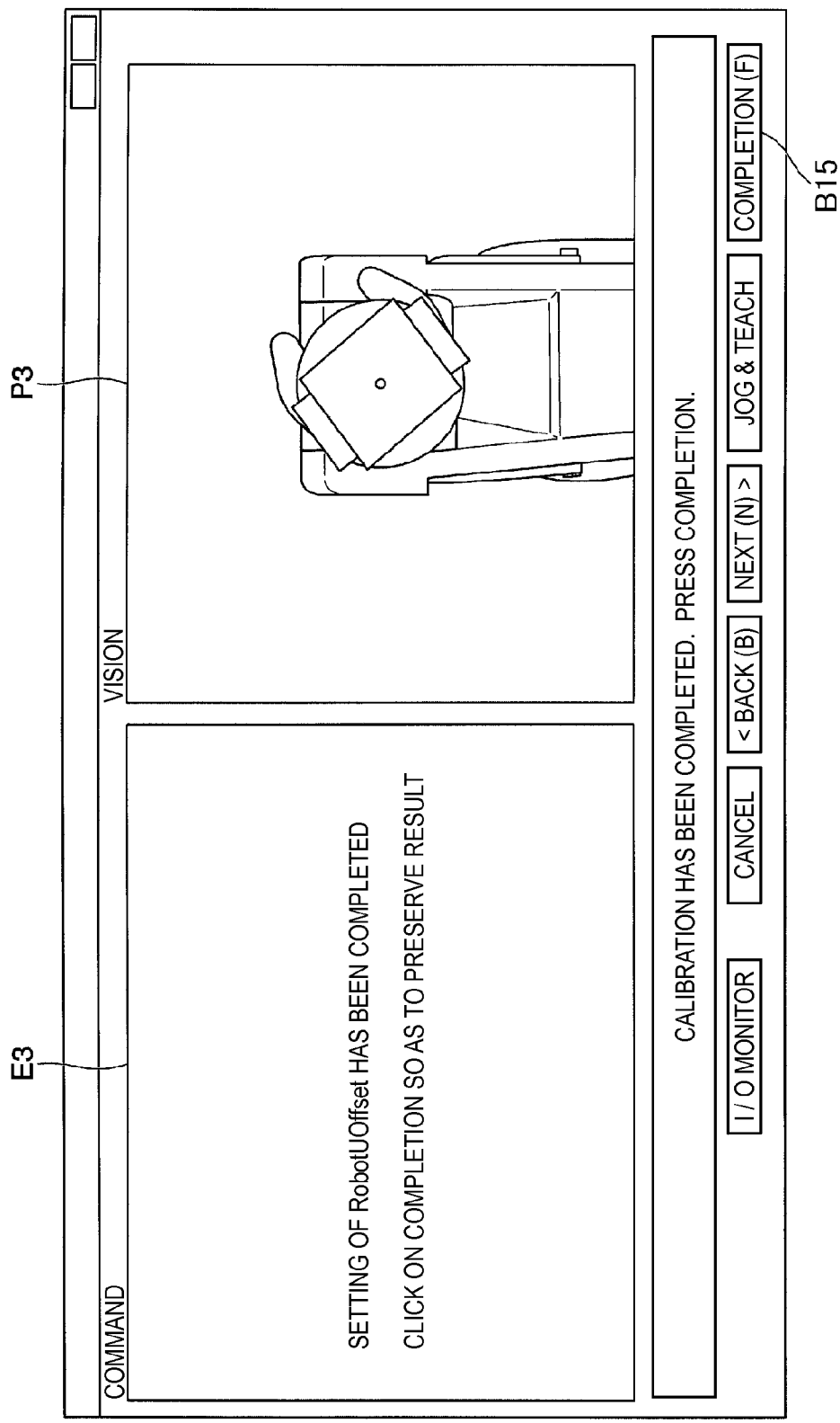
FIG. 23 is a diagram illustrating an example of a setting completion screen.

Here, with reference to FIG. 23, the setting completion screen will be described. FIG. 23 is a diagram illustrating an example of the setting completion screen. The display control unit 161 displays an image or explanation for notifying that setting has been completed in a column E3 on the setting completion screen. As illustrated in FIG. 23, the display control unit 161 may display a captured image P3 obtained by the imaging section 10 on the setting completion screen but may not display the captured image. The display control unit 161 displays a completion button B15 on the setting completion screen. If the user presses the completion button B15, the display control unit 161 displays a setting screen after teaching is finished, described in step S390.

Figure 24:
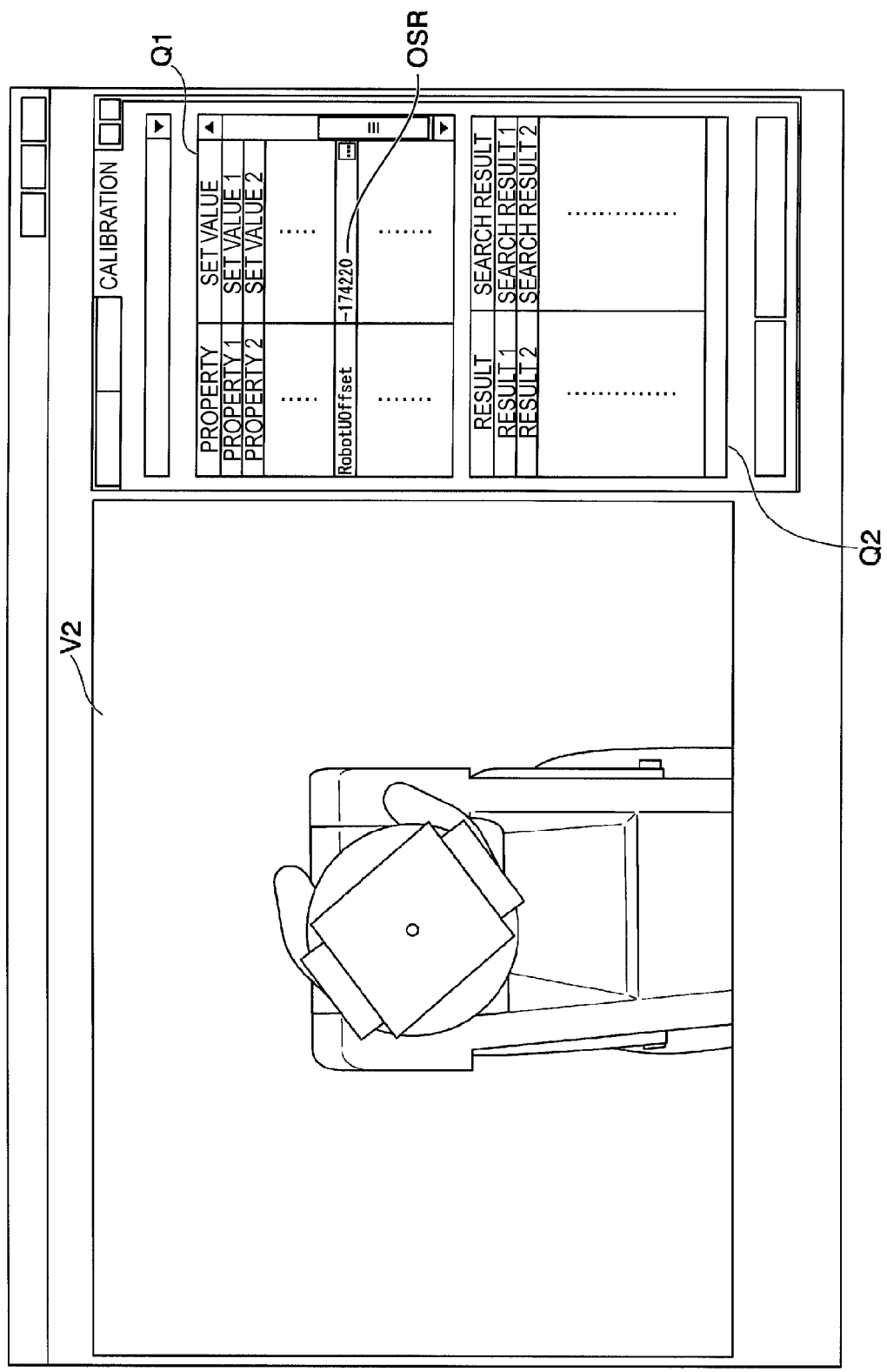
FIG. 24 is a diagram illustrating an example of the setting screen after teaching is completed.

Hereinafter, a description will be made assuming the user presses the completion button B15 on the setting completion screen. Next, the display control unit 161 displays a setting screen again (step S390). Here, with reference to FIG. 24, a description will be made of a setting screen after teaching is finished. FIG. 24 is a diagram illustrating an example of the setting screen after teaching is finished.

The setting screen after teaching is finished, illustrated in FIG. 24 displays not 0.000 but a value (for example, −174.220 pixels) of the reference offset calculated in step S320 as a set value OSR correlated with the property RobotUOffset unlike the setting screen before teaching is performed, illustrated in FIG. 17. As mentioned above, if teaching using the first teaching screen UI1 and the second teaching screen UI2 is finished, the information taught to the control apparatus 130 is displayed on the setting screen.

As mentioned above, the teaching apparatus 105 teaches the reference information to the control apparatus 130 through the processes in steps S280 to S390.

After the reference information is taught to the control apparatus 130, the robot system 101 causes the robot 20 to perform predetermined work. At this time, the robot system 101 causes the imaging section 10 to capture an image of the work object O every time a new work object O is placed on the table TB, and detects a work object position and attitude on the captured image on the basis of the captured image. The robot system 101 calculates a difference between the work object position and attitude and the work object reference position and attitude on the basis of the detected work object position and attitude and the work object reference position and attitude included in the reference information which is taught by the 105.

The robot system 101 calculates a control point target position and attitude on the basis of the calculated difference (that is, a relative position and attitude of the work object O for the work object reference position and attitude) between the work object position and attitude and the work object reference position and attitude and the reference offset included in the reference information, and moves the gripping portion HND of the robot 20 so that the calculated control point target position and attitude match the control point position and attitude. Then, the robot system 101 controls the robot 20 to grip the work object O and to dispose the work object O at the arrangement position X. A difference between an attitude of the work object O and a reference attitude of the work object O is an example of an attitude of the work object.

In the robot system 101 according to the present embodiment, a reference offset is calculated by the computation unit 163, but, alternatively, the reference offset may be calculated by a separate device. In this case, the teaching apparatus 105 requests the device to calculate the reference offset via the control apparatus 130.

As described above, the robot system 101 according to the present embodiment displays the first teaching screen UI1 for displaying the work object O placed within an imaging range of the imaging section 10 and the second teaching screen UI2 for causing the robot 20 to grip the work object O placed within the imaging range of the imaging section 10, and detects a position and an attitude of the work object O by using a result of the robot 20 gripping the work object O. Consequently, the robot system 101 can reduce a burden on the user related to teaching.

The robot system 101 detects the position and the attitude of the work object O for the imaging range as a work object reference position and attitude on the basis of the work object O placed within the imaging range of the imaging section 10, displayed on the first teaching screen UI1. Consequently, the robot system 101 can teach the detected work object reference position and attitude to the control apparatus 130.

The robot system 101 computes a difference between a work object position and attitude of a new work object O placed within the imaging range during predetermined work and the work object reference position and attitude by using the work object reference position and attitude of the work object O detected by the detection unit 162 and a result of the robot 20 gripping the work object O. Consequently, the robot system 101 can perform predetermined work on the work object O on the basis of a reference attitude of the work object O, and the difference between the work object position and attitude and the work object reference position and attitude, computed by using the result of the robot 20 gripping the work object O.

In the robot system 101, the second teaching screen UI2 includes the region P2 in which a captured image obtained by the imaging section 10 is displayed. Consequently, the robot system 101 can provide the user with an environment in which the user moves the robot 20 through a jog operation while checking the captured image.

In the robot system 101, the first teaching screen UI1 includes the region in which work procedures are displayed and the second teaching screen UI2 includes the region in which work procedures are displayed. Consequently, the robot system 101 reduces time and effort for the user to read a manual and thus allows the user to perform efficient work.

Third Embodiment

Hereinafter, a third embodiment of the invention will be described with reference to the drawings. In the present embodiment, the same constituent elements as in the first embodiment will be given the same reference numerals and will be described.

Figure 25:
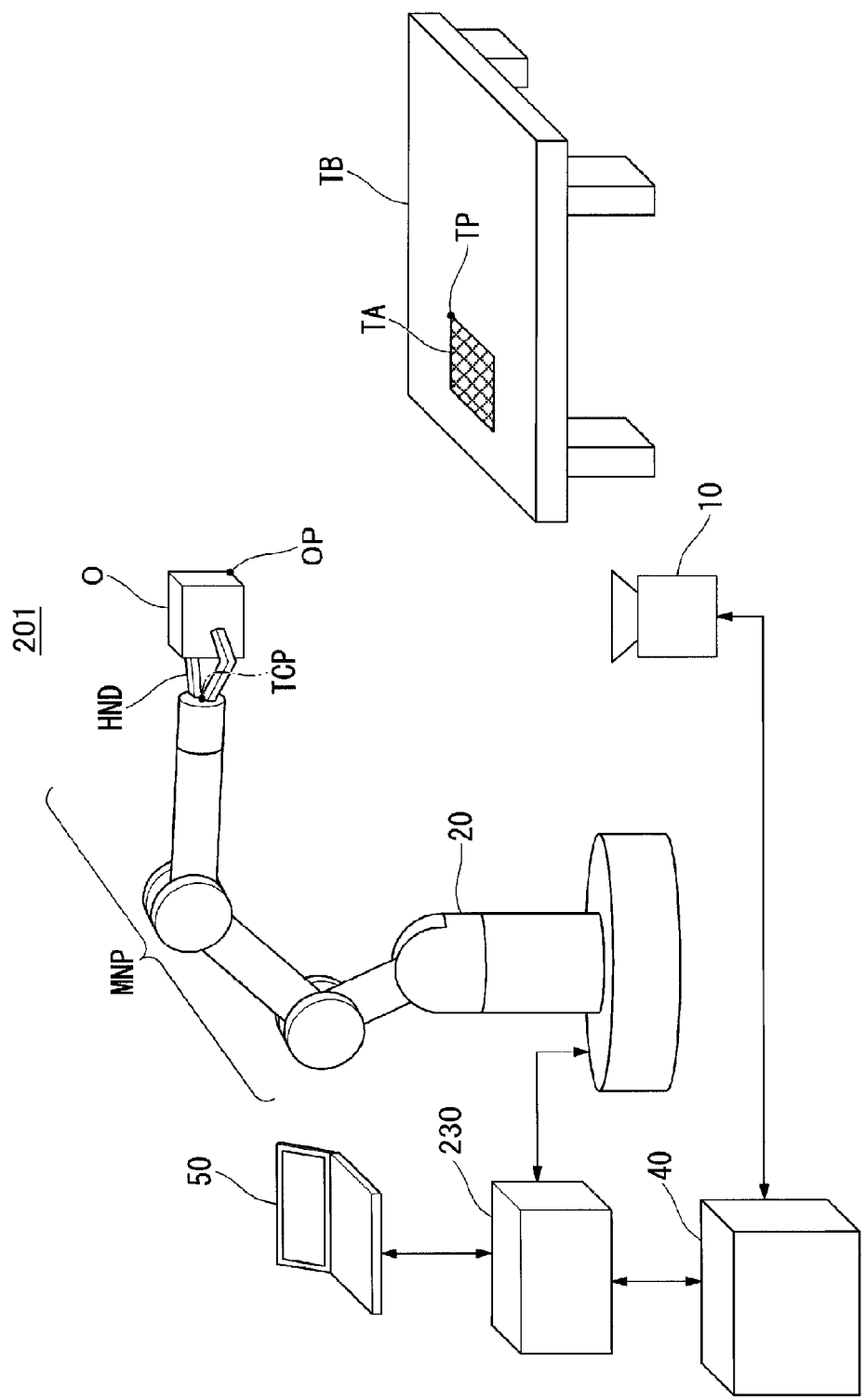
FIG. 25 is a diagram illustrating a configuration of a robot system according to the present embodiment.

FIG. 25 is a diagram illustrating a configuration of a robot system 201 according to the present embodiment. The robot system 201 includes an imaging section 10, a single-arm robot 20 provided with a gripping portion HND (end effector) and a manipulator MNP, a control apparatus 230, an image processing apparatus 40, and an information processing terminal 50. In the present embodiment, the single-arm robot indicates a robot having a single arm constituted by the gripping portion HND and the manipulator MNP.

In the robot system 201, the imaging section 10 captures an image of a range including the work object O gripped by the robot 20. The work object O is an object which can be gripped by the robot 20, and is an industrial part such as a screw, a bolt, a gear, or a tool, but is not limited thereto, and may be other objects as long as the objects can be gripped by the robot 20. The work object O is an example of a work object. The robot system 201 calculates relative positions and relative attitudes (hereinafter, referred to as an offset) between a control point TCP and a representative point OP which is set in the work object O gripped by the robot 20 in advance on the basis of the captured image of the range including the work object O.

The control point TCP indicates a position and an attitude of the gripping portion HND when the control apparatus 230 moves the gripping portion HND (and the manipulator MNP) of the robot 20, and indicates a central point (a tool center point) of a flange provided at an end of the manipulator MNP at which the gripping portion HND is provided in this example. The control point TCP is an example of a first position. The control point TCP is an example of a predetermined position of a hand. The representative point OP is a point indicating a position and an attitude of the work object O, set in the control apparatus 230 in advance, and is a feature point of the work object O (in this example, a corner OP illustrated in FIG. 25). The representative point OP is an example of a second position. The robot system 201 moves the control point TCP by using the manipulator MNP and the gripping portion HND of the robot 20 so that a position and an attitude of the representative point OP (hereinafter, referred to as a work object position and attitude) match a position and attitude of the target point TP (hereinafter, referred to as a target point position and attitude) on the basis of the calculated offset. Consequently, the robot system 201 causes the robot 20 to dispose the work object O in the target area TA at an accurate position and attitude. Hereinafter, for convenience of description, a position and an attitude of the control point TCP are referred to as a control point position and attitude.

Here, the target point TP is a point in the target area TA in which the work object O is disposed by the robot 20 and is a point which matches the representative point OP when the work object O is disposed in the target area TA at an accurate position and attitude. The target area TA is an area in which the work object O is disposed by the robot 20, and is provided on a table TB in FIG. 25. The table TB is, for example, a stand on which the robot 20 disposes the work object O.

The imaging section 10 is a camera including, for example, a charge coupled device (CCD) or a complementary metal oxide semiconductor (CMOS) which is an imaging element converting collected light into an electric signal. The imaging section 10 is a monocular camera, but may be formed of two or more cameras such as a stereo camera.

The imaging section 10 is communicably connected to the image processing apparatus 40 via a cable. Wired communication using the cable is realized by a standard such as Ethernet (registered trademark) or a universal serial bus (USB). The imaging section 10 may be connected to the image processing apparatus 40 by using wireless communication realized by a communication standard such as Wi-Fi (registered trademark).

The imaging section 10 is provided at a position where a range (hereinafter, referred to as an imaging range) including the above-described control point TCP and the representative point OP of the work object O gripped by the gripping portion HND can be imaged when the robot 20 moves the work object O to a predetermined imaging position with the manipulator MNP and the gripping portion HND. In FIG. 25, the imaging section 10 is provided at a position where an image of the above-described imaging range can be captured vertically upward from below.

Instead of the configuration in which the imaging section 10 is provided at a position where an image of the above-described imaging range can be captured vertically upward from below, there may be a configuration in which the imaging section 10 is provided at a position where an image of the imaging range can be captured in a horizontal direction, a configuration in which the imaging section 10 is provided at a position where an image of the imaging range can be captured vertically downward from above, and a configuration in which the imaging section 10 is provided at a position where an image of the imaging range can be captured from other directions. The imaging section 10 captures a still image as a captured image, but may alternatively capture a moving image as a captured image. The imaging section 10 is an example of an imaging device.

The robot 20 is a single-arm robot including, for example, the gripping portion HND, the manipulator MNP, and a plurality of actuator (not illustrated). The robot 20 may be a SCARA robot (horizontally articulated robot) or a dual-arm robot instead of the single-arm robot. The SCARA robot is a robot of which a manipulator is moved only in a horizontal direction, and only a slide shaft at a front end of the manipulator is moved in a vertical direction. The dual-arm robot is a robot including two arms each of which is constituted by the gripping portion HND and the manipulator MNP.

The arm of the robot 20 is of a six-axis vertically articulated type, and can perform an operation of a six-axial degree of freedom through interlocking operations among the support stand, the manipulator MNP, and the gripping portion HND using the actuators. The arm of the robot 20 may operate in five or less degrees of freedom (five axes) or may operate in seven or more degrees of freedom (seven axes). Hereinafter, a description will be made of an operation of the robot 20, performed by the arm including the gripping portion HND and the manipulator MNP. The gripping portion HND of the robot 20 is provided with claws which can grip an object. The gripping portion HND is an example of a hand.

The robot 20 is communicably connected to the control apparatus 230 via, for example, a cable. Wired communication using the cable is realized by a standard such as Ethernet (registered trademark) or a USB. The robot 20 may be connected to the control apparatus 230 by using wireless communication realized by a communication standard such as Wi-Fi (registered trademark). In the robot system 201, the robot 20 is configured to be connected to the control apparatus 230 which is provided outside the robot 20 as illustrated in FIG. 25, but the control apparatus 230 may be built into the robot 20 instead of this configuration.

The robot 20 acquires a control signal from the control apparatus 230, and moves the work object O gripped by the gripping portion HND of the robot 20 from the present position to a predetermined imaging position with the manipulator MNP on the basis of the acquired control signal. The robot 20 acquires a control signal from the control apparatus 230, and moves the work object O from the imaging position and disposes the work object O in the target area TA with the manipulator MNP on the basis of the acquired control signal.

The control apparatus 230 outputs a control signal to the robot 20 so as to control the robot 20. The control apparatus 230 controls the robot 20 to grip the work object O and to move the work object O to the imaging position. The control apparatus 230 causes the image processing apparatus 40 to calculate the above-described offset. If information indicating the offset is acquired from the image processing apparatus 40, the control apparatus 230 calculates a control point position and attitude (hereinafter, referred to as a control point target position and attitude) obtained when a representative point position and attitude related to the work object O match a target point position and attitude on the basis of the acquired information indicating the offset and the target point position and attitude which are registered in the control apparatus 230 in advance via the information processing terminal 50. The control apparatus 230 calculates the control point target position and attitude and then causes the robot 20 to move the control point TCP so that the control point position and attitude match the control point target position and attitude.

In the robot system 201, instead of the configuration in which the control apparatus 230 calculates the control point target position and attitude, the image processing apparatus 40 may calculate the control point target position and attitude. In this case, the control apparatus 230 outputs information indicating the target point position and attitude which are registered in the control apparatus 230 in advance, to the image processing apparatus 40. The image processing apparatus 40 calculates the control point target position and attitude on the basis of the target point position and attitude acquired from the control apparatus 230 and the offset calculated by the image processing apparatus 40, and outputs information indicating the calculated control point target position and attitude to the control apparatus 230.

The image processing apparatus 40 causes the imaging section 10 to capture an image of the above-described imaging range in response to a request from the control apparatus 230. If a captured image is acquired from the imaging section 10, the image processing apparatus 40 calculates the above-described offset on the basis of the acquired captured image. The image processing apparatus 40 outputs information indicating the calculated offset to the control apparatus 230.

The information processing terminal 50 registers (inputs) various information pieces in (to) the control apparatus 230. The information processing terminal 50 is, for example, a notebook personal computer (PC), but may alternatively be a desktop PC, a tablet PC, a mobile phone terminal, a multi-function mobile phone terminal (smartphone), a personal digital assistant (PDA), or the like. The information processing terminal 50 outputs information indicating the above-described target point position and attitude to the image processing apparatus 40 and registers (stores) the information therein. The information processing terminal 50 may be integrally formed with the image processing apparatus 40.

Figure 26:
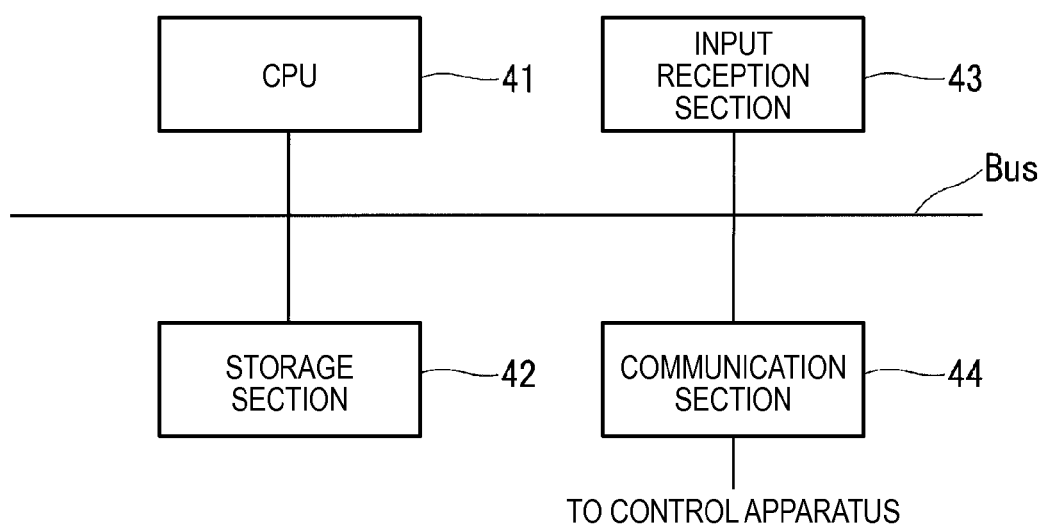
FIG. 26 is a diagram illustrating an example of a hardware configuration of an image processing apparatus.

Next, with reference to FIG. 26, a description will be made of a hardware configuration of the image processing apparatus 40. FIG. 26 is a diagram illustrating an example of a hardware configuration of the image processing apparatus 40. The image processing apparatus 40 includes, for example, a central processing unit (CPU) 41, a storage section 42, an input reception section 43, and a communication section 44, and performs communication with the control apparatus 230 via the communication section 44. These constituent elements are communicably connected to each other via a bus Bus. The CPU 41 executes various programs stored in the storage section 42.

The storage section 42 includes, for example, a hard disk drive (HDD), a solid state drive (SSD), an electrically erasable programmable read-only memory (EEPROM), a read only memory (ROM), and a random access memory (RAM), and stores various information pieces or images processed by the image processing apparatus 40, and programs. Instead of being built into the image processing apparatus 40, the storage section 42 may be an externally attached storage device which is connected to a digital input and output port such as a USB.

The input reception section 43 is, for example, a keyboard, a mouse, a touch panel, and other input devices. The input reception section 43 may be configured of a touch panel so as to function as a display section. The input reception section 43 may not be provided in the image processing apparatus 40. In this case, inputting to the image processing apparatus 40 may be received from either or both of the control apparatus 230 and the information processing terminal 50.

The communication section 44 includes, for example, a digital input and output port such as a USB, or an Ethernet port.

Figure 27:
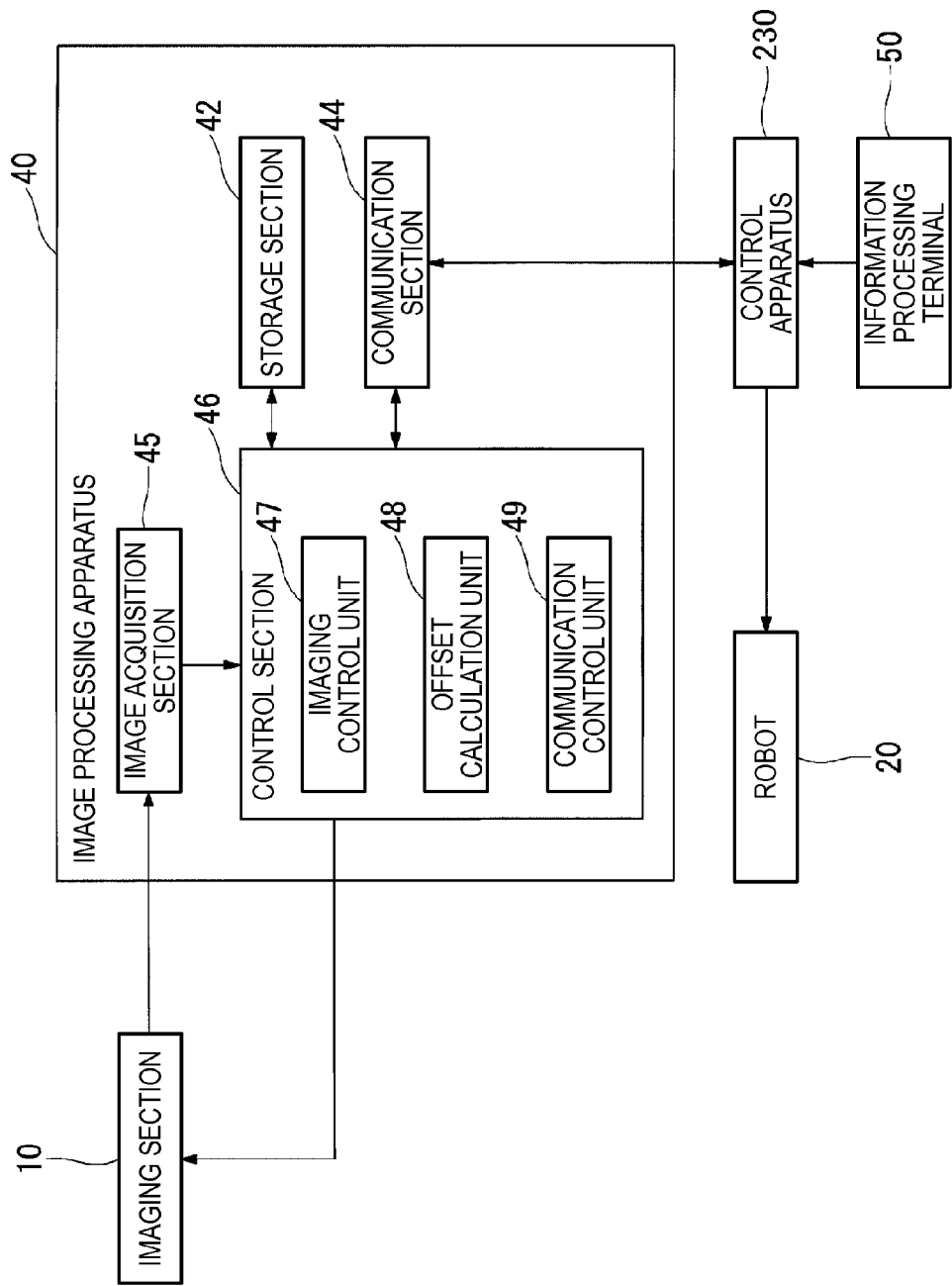
FIG. 27 is a diagram illustrating an example of a functional configuration of the image processing apparatus.

Next, with reference to FIG. 27, a functional configuration of the image processing apparatus 40 will be described. FIG. 27 is a diagram illustrating an example of a functional configuration of the image processing apparatus 40. The image processing apparatus 40 includes the storage section 42, the communication section 44, an image acquisition section 45, and a control section 46. Some or all function units included in the control section 46 are realized by, for example, the CPU 41 executing the various programs stored in the storage section 42. In addition, some or all of the function units may be hardware function units such as a large scale integration (LSI) circuit or an application specific integrated circuit (ASIC).

The image acquisition section 45 acquires a captured image from the imaging section 10. The image acquisition section 45 outputs the acquired captured image to the control section 46.

The control section 46 includes an imaging control unit 47, an offset calculation unit 48, and a communication control unit 49.

The imaging control unit 47 controls the imaging section 10 to capture an image.

The offset calculation unit 48 calculates an offset between a control point position and attitude and a work object position and attitude on the basis of a captured image acquired by the image acquisition section 45.

The communication control unit 49 controls the communication section 44 to output information indicating the offset calculated by the offset calculation unit 48 to the control apparatus 230.

Figure 28:
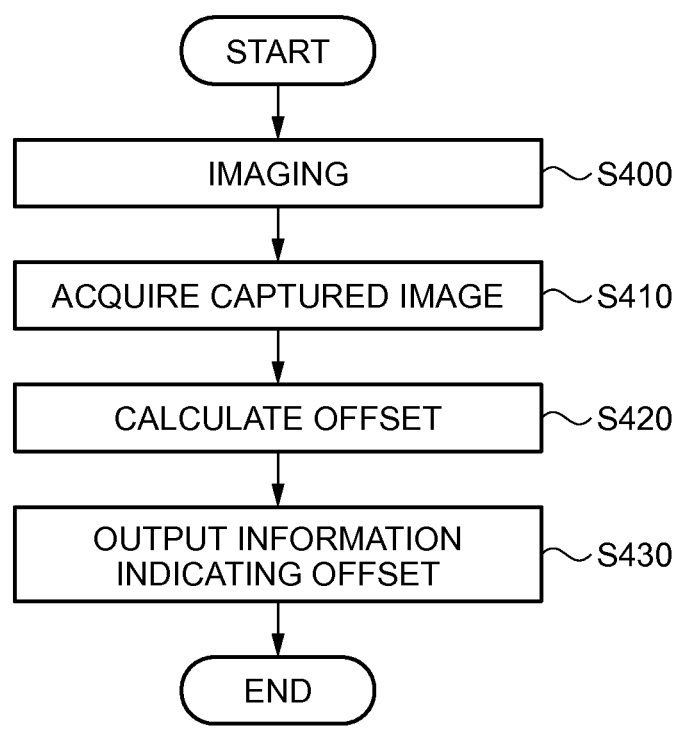
FIG. 28 is a flowchart illustrating an example of a flow of a process in which the image processing apparatus calculates an offset.

Hereinafter, with reference to FIG. 28, a description will be made of a process in which the image processing apparatus 40 calculates an offset. FIG. 28 is a flowchart illustrating an example of a flow of a process in which the image processing apparatus 40 calculates an offset. Hereinafter, a description will be made of a process after the robot 20 moves the work object O to an imaging position. First, the imaging control unit 47 controls the imaging section 10 to capture an image of the above-described imaging range (step S400). Next, the image acquisition section 45 acquires the captured image obtained in step S400 from the imaging section 10, and outputs the acquired captured image to the control section 46 (step S410).

Figure 29A:
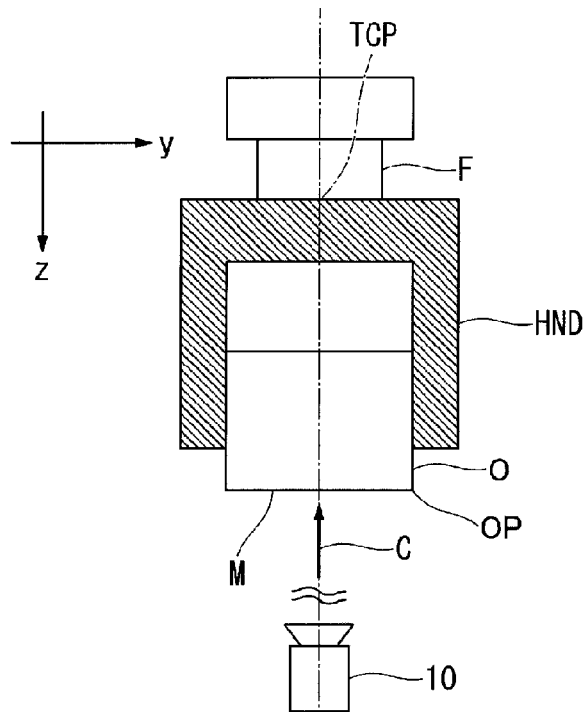
FIGS. 29A and 29B illustrate an example of a state in which an imaging section captures an image of an imaging range and an example of an image captured by the imaging section.
Figure 29B:
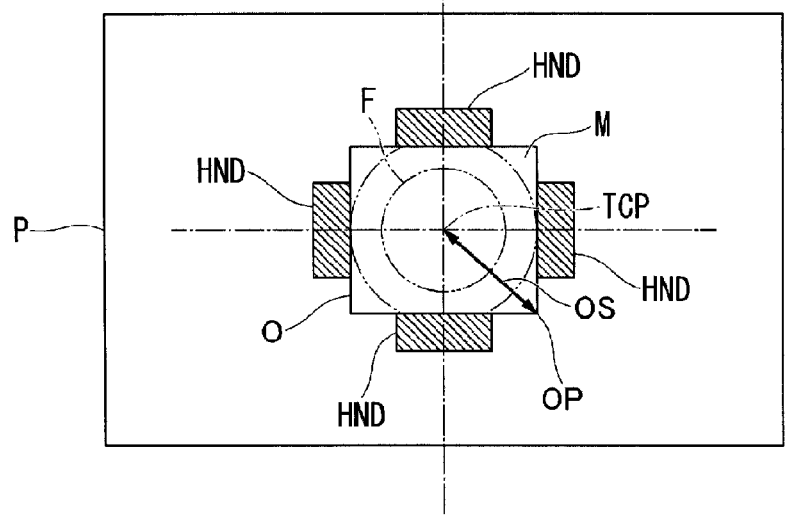

Next, the offset calculation unit 48 calculates an offset between a control point position and attitude and a work object position and attitude on the basis of the captured image acquired from the image acquisition section 45 (step S420). Here, with reference to FIGS. 29A and 29B, a description will be made of a process of calculating the offset between the control point position and attitude and the work object position and attitude on the basis of the captured image. FIGS. 29A and 29B show diagrams respectively illustrating an example of a state in which the imaging section 10 captures an image of the imaging range and an example of a captured image obtained by the imaging section 10.

FIG. 29A illustrates a state in which the imaging section 10 captures an image of the imaging range. In FIG. 29A, a description will be made assuming that the work object O gripped by the gripping portion HND has been moved to an imaging position by the robot 20. After the work object O has been moved to the imaging position, the imaging section 10 captures an image of the imaging range in a direction C illustrated in FIG. 29A. The direction C is a direction perpendicular to a face M of the work object O gripped by the gripping portion HND. The face M is a face which opposes the flange F at which the gripping portion HND is provided when the work object O is gripped by the gripping portion HND. Therefore, the imaging section 10 captures an image of the imaging range in a state in which the face M is parallel to a plane of the imaging element.

The face M being made parallel to the plane of the imaging element is aimed at detecting an offset which is obtained when the work object O is disposed in the target area TA at an accurate position and attitude and is an offset between a control point position and attitude and a representative point position and attitude on a target area face (that is, on a plane of the table TB) when the control point TCP and the representative point OP are projected onto the target area face of the target area TA. As mentioned above, an offset is treated as an offset on the target area face, and thus computation cost of the control apparatus 230 or the image processing apparatus 40 can be minimized. Such offset treatment is only an example, and other offset treatment methods may be used.

FIG. 29B illustrates an example of a captured image obtained by the imaging section 10. As illustrated in FIG. 29B, in the captured image, the face M is imaged from below. The captured image includes the representative point OP related to the work object O. The image processing apparatus 40 causes the imaging section 10 to obtain a captured image as illustrated in FIG. 29B and calculates an offset OS between a control point position and attitude and a work object position and attitude on the basis of the captured image.

In FIG. 29B, the offset OS indicates a relative position and a relative attitude on an XY plane which extend along the X axis and the Y axis on the captured image. The image processing apparatus 40 detects, for example, a shape of the gripping portion HND from the captured image through pattern matching or the like so as to detect a position (that is, a central position of the flange F) of the control point TCP on the captured image. The image processing apparatus 40 detects, for example, an attitude of the control point TCP on the captured image on the basis of a direction in which the manipulator MNP (not illustrated) included in the captured image extends. When detecting an attitude of the control point TCP, the image processing apparatus 40 may detect an attitude of the control point TCP by using other methods.

The image processing apparatus 40 detects a position on the captured image of the representative point OP related to the work object O, for example, through pattern matching. The image processing apparatus 40 detects a direction on the captured image of a side of the face M, for example, through pattern matching, and detects an attitude of the representative point OP on the captured image on the basis of the detected direction. When detecting the attitude of the representative point OP, the image processing apparatus 40 may detect the attitude of the representative point OP by using other methods. The image processing apparatus 40 calculates an offset OS in a robot coordinate system on the basis of the detected control point position and attitude on the captured image and the work object position and attitude on the captured image. A coordinate (pixel coordinate) system on the captured image may be correlated with the robot coordinate system through calibration.

Next, the communication control unit 49 controls the communication section 44 to output information indicating the offset between the control point position and attitude and the work object position and attitude, calculated by the offset calculation unit 48 in step S420, to the control apparatus 230 (step S430).

As mentioned above, the robot system 201 causes the image processing apparatus 40 which is formed separately from the control apparatus 230 to perform an image process for calculating the offset between the control point position and attitude and the work object position and attitude. Consequently, the robot system 201 can minimize a load such as computation related to the process performed by the control apparatus 230. The robot system 201 can minimize the number of times of communication performed by the control apparatus 230.

In the robot system 201, even if a new control apparatus X is provided which is different from the control apparatus 230 due to version-up of the control apparatus 230 which controls the robot 20, it is not necessary to create a new program which has a format capable of being executed by the control apparatus X and is related to an image process for calculating an offset. In this case, in the robot system 201, if codes related to inputting and outputting of information with image processing apparatus 40 have only to be written to a program of the control apparatus X for controlling the robot 20, an offset can be easily calculated, and the robot 20 can be controlled on the basis of the calculated offset.

As mentioned above, in the robot system 201 according to the present embodiment, the image processing apparatus 40 calculates the offset OS between the control point position and attitude and the work object position and attitude by using a captured image obtained by the imaging section 10. Consequently, the robot system 201 can efficiently control the robot 20.

The robot system 201 detects the control point position and attitude from the captured image. Consequently, the robot system 201 can calculate the offset OS between the control point position and attitude and the work object position and attitude.

The robot system 201 detects the offset OS between the control point position and attitude and the work object position and attitude from the captured image through the pattern matching. Consequently, the robot system 201 can detect the offset OS between the control point position and attitude and the work object position and attitude from the captured image through the pattern matching.

As mentioned above, although the embodiments of the invention have been described in detail with reference to the drawings, specific configurations are not limited to the embodiments and may be changed, replaced, omitted, or the like without departing from the spirit of the invention.

A program for realizing the function of any function unit in the above-described apparatus (for example, the teaching apparatus 5 of the robot system 1) may be recorded on a computer readable recording medium, and the program may be read to a computer system and be executed. The "computer system" mentioned here is assumed to include an operating system (OS) or hardware such as a peripheral apparatus. The "computer readable recording medium" includes a portable medium such as a flexible disk, a magneto-optical disk, a read only memory (ROM), or a compact disc (CD)-ROM, and a hard disk built into the computer system. In addition, the "computer readable recording medium" is assumed to include a memory which holds a program for a certain period of time, such as a volatile memory (random access memory (RAM)) of a computer system serving as a server or a client when the program is transmitted via a network such as the Internet or a communication line such as a telephone line.

The program may be transmitted from a computer system in which the program is stored in a storage device or the like to another computer system via a transmission media or by using a carrier wave in the transmission medium. Here, the "transmission medium" for transmitting the program includes a medium having a function of transmitting information, such as a network (communication network) such as the Internet or a communication line such as a telephone line.

The program may realize some of the above-described functions. The program may be a so-called differential file (differential program) which can realize the above-described functions in combination with a program which has already been recorded in the computer system.

The entire disclosures of Japanese Patent Application Nos. 2014-136315, filed Jul. 1, 2014; 2014-136316, filed Jul. 1, 2014 and 2014-136317, filed Jul. 1, 2014 are expressly incorporated by reference herein.

What is claimed is:

1. A teaching apparatus for a robot configured to move a work object, the teaching apparatus comprising:
    a memory configured to store computer-readable instructions;
    a display configured to display the work object and teaching instructions for the robot;
    a screen configured to display operating commands including first and second operating commands of the robot;
    an input device configured to allow the screen to accept the operating commands; and
    a processor configured to execute the computer-readable instructions so as to:
        cause an imaging device to capture an image of the work object grasped by a hand of the robot, the imaging device configured to output the captured image; and
        calculate a hand position and attitude based on the captured image when the work object is aligned at a target position and attitude,
    wherein the screen is divided into first and second screen areas,
        the processor is configured to cause the first screen area to accept the first operating command via the input device so as to operate the robot such that the work object is placed in a desired position within an imaging range of the imaging device, and
        the processor is configured to cause the second screen area to accept the second operating command via the input device so as to operate the robot such that the work object is aligned at the target position and attitude.

2. The teaching apparatus according to claim 1,
    wherein either or both of the first screen area and the second screen area include a region in which the captured image obtained by the imaging device is displayed.

3. The teaching apparatus according to claim 1,
    wherein either or both of the first screen area and the second screen area include a region in which a work procedure is displayed.

4. The teaching apparatus according to claim 1,
    wherein the processor is configured to calculate a relative position and attitude between the target position and attitude and a predetermined position and attitude by using the captured image based on the first operating command,
    the processor is configured to acquire the target position and attitude based on the second operating command, and
    the processor is configured to calculate the predetermined position and attitude by using the calculated relative position and attitude and the target position and attitude.

5. A robot system comprising:
    a robot having a hand, the robot being configured to move a work object; and
    a teaching apparatus configured to teach a predetermined position and attitude to the robot, the teaching apparatus includes:
    a display configured to display the work object and teaching instructions for the robot;
    a screen configured to display operating commands including first and second operating commands of the robot;
    an input device configured to allow the screen to accept the operating commands; and
    a processor configured to execute the computer-readable instructions so as to:
        cause an imaging device to capture an image of the work object grasped by a hand of the robot, the imaging device configured to output the captured image; and
        calculate a hand position and attitude based on the captured image when the work object is aligned at a target position and attitude,
    wherein the screen is divided into first and second screen areas,
        the processor is configured to cause the first screen area to accept the first operating command via the input device so as to operate the robot such that the work object is placed in a desired position within an imaging range of the imaging device, and
        the processor is configured to cause the second screen area to accept the second operating command via the input device so as to operate the robot such that the work object is aligned at the target position and attitude.

* * * * *